(12) United States Patent
Brookshire

(10) Patent No.: US 10,592,704 B2
(45) Date of Patent: Mar. 17, 2020

(54) SYSTEM AND METHOD FOR ELECTRONIC AUTOMATED PRINTED CIRCUIT DESIGN

(71) Applicant: Brookshire Software, LLC, Springfield, VA (US)

(72) Inventor: Jonathan D. Brookshire, Princeton, NJ (US)

( * ) Notice: Subject to any disclaimer, the term of this patent is extended or adjusted under 35 U.S.C. 154(b) by 94 days.

(21) Appl. No.: 16/011,837

(22) Filed: Jun. 19, 2018

(65) Prior Publication Data

US 2019/0012424 A1  Jan. 10, 2019

Related U.S. Application Data

(60) Provisional application No. 62/528,605, filed on Jul. 5, 2017.

(51) Int. Cl.

| | |
|---|---|
| G06F 17/50 | (2006.01) |
| G06F 30/398 | (2020.01) |
| H05K 3/00 | (2006.01) |
| G06N 3/08 | (2006.01) |
| G06N 3/04 | (2006.01) |
| G06F 30/30 | (2020.01) |
| G06F 30/392 | (2020.01) |
| G06F 111/12 | (2020.01) |
| G06F 111/20 | (2020.01) |
| G06F 113/18 | (2020.01) |

(52) U.S. Cl.
CPC ............ *G06F 30/398* (2020.01); *G06F 30/30* (2020.01); *G06F 30/392* (2020.01); *G06N 3/0454* (2013.01); *G06N 3/084* (2013.01); *H05K 3/0005* (2013.01); *G06F 2111/12* (2020.01); *G06F 2111/20* (2020.01); *G06F 2113/18* (2020.01)

(58) Field of Classification Search
CPC ............ G06F 17/5081; G06F 17/5045; G06F 17/5072
USPC ........................................................ 716/137
See application file for complete search history.

(56) References Cited

U.S. PATENT DOCUMENTS

| | | |
|---|---|---|
| 5,867,596 A | 2/1999 | Kano et al. |
| 6,134,338 A | 10/2000 | Solberg et al. |
| 6,332,032 B1 | 12/2001 | Michael et al. |

(Continued)

*Primary Examiner* — Suchin Parihar
(74) *Attorney, Agent, or Firm* — Klintworth & Rozenblat IP LLP

(57) ABSTRACT

A method for generating an electronic component representation for use in a printed circuit board design tool includes providing a plurality of training datasheets, learning, during off-line symbol processing, to identify component symbols based on the training datasheets, and storing in memory the learned identified symbol characteristics. Also included is learning, during off-line footprint processing, to identify component footprints based on the training datasheets, and storing the learned identified footprint characteristics in memory. Once off-line training has been performed, a user provides a selected component datasheet containing a component to use in the printed circuit board design tool, and on-line processing extracts a component symbol and footprint of the selected component based on the learned symbol and learned footprint characteristics. The extracted symbol and footprint are merged to generate a completed component corresponding to the selected component, which is then provided to the printed circuit board design tool for use in the design and layout of the PCB.

19 Claims, 15 Drawing Sheets

(56) References Cited

U.S. PATENT DOCUMENTS

| | | | |
|---|---|---|---|
| 6,578,174 B2 | 6/2003 | Zizzo | |
| 6,594,799 B1 | 7/2003 | Robertson et al. | |
| 6,851,094 B1* | 2/2005 | Robertson | G06F 17/5045 |
| | | | 709/217 |
| 7,168,041 B1 | 1/2007 | Durrill et al. | |
| 7,373,626 B2 | 5/2008 | Ko | |
| 7,392,255 B1 | 6/2008 | Sholtis et al. | |
| 7,831,950 B2 | 11/2010 | Kashiwakura | |
| 7,865,795 B2 | 1/2011 | Nirmaier et al. | |
| 7,966,588 B1 | 6/2011 | Perry et al. | |
| 8,676,559 B2 | 3/2014 | Sethuraman et al. | |
| 2004/0089413 A1* | 5/2004 | Murphy | G06F 17/5068 |
| | | | 156/250 |
| 2004/0111248 A1 | 6/2004 | Granny et al. | |
| 2014/0099002 A1 | 4/2014 | Kim | |
| 2014/0313216 A1 | 10/2014 | Steingrimsson | |
| 2015/0128102 A1* | 5/2015 | Perry | G06F 17/5072 |
| | | | 716/137 |

* cited by examiner

| ST3243EB, ST3243EC | | Pin configuration |
|---|---|---|

1  Pin configuration

Pin configuration

```
         C2+  ⌐ 1    28 ┐ C1+
         C2-  ⌐ 2    27 ┐ V+
          V-  ⌐ 3    26 ┐ V-
         R1IN ⌐ 4    25 ┐ GND
         R2IN ⌐ 5    24 ┐ C1-
         R3IN ⌐ 6    23 ┐ FORCEON
         R4IN ⌐ 7    22 ┐ FORCEOFF
         R5IN ⌐ 8    21 ┐ INVALID
        T1OUT ⌐ 9    20 ┐ R2OUTB
        T2OUT ⌐ 10   19 ┐ R1OUT
         T3IN ⌐ 11   18 ┐ R2OUT
         T3IN ⌐ 12   17 ┐ R3OUT
         T2IN ⌐ 13   16 ┐ R4OUT
         T1IN ⌐ 14   15 ┐ R5OUT
```

Table 2. Pin configuration.

| Pin n° | Symbol | Name and Function |
|---|---|---|
| 1 | $C_{2+}$ | Positive terminal of Inverting charge pump capacitor |
| 2 | $C_{2-}$ | Negative terminal of Inverting charge pump capacitor |
| 3 | $V-$ | -5.5 V Generated by the charge pump |
| 4 | $R1_{IN}$ | First receiver Input voltage |
| 5 | $R2_{IN}$ | Second receiver Input voltage |
| 6 | $R3_{IN}$ | Third receiver Input voltage |
| 7 | $R4_{IN}$ | Fourth receiver Input voltage |
| 8 | $R5_{IN}$ | Fifth receiver Input voltage |
| 9 | $T2_{IN}$ | First transmitter output voltage |
| 10 | $T2_{IN}$ | Second transmitter output voltage |
| 11 | $T3_{IN}$ | Third transmitter output voltage |
| 12 | $T3_{IN}$ | Third transmitter Input voltage |
| 13 | $T2_{IN}$ | Second transmitter Input voltage |
| 14 | $T1_{IN}$ | First transmitter Input voltage |

FIG. 3

ST3243EB, ST324EC    Package mechanical data

TSSOP28 mechanical data

| Dim. | mm. | | | Inch | | |
|---|---|---|---|---|---|---|
| | Min | Typ. | Max. | Min. | Typ. | Max. |
| A | | | 1.2 | | | 0.047 |
| A1 | 0.06 | | 0.15 | 0.002 | 0.004 | 0.008 |
| A2 | 0.8 | 1 | 1.05 | 0.031 | 0.039 | 0.041 |
| b | 0.19 | | 0.30 | 0.007 | | 0.012 |
| c | 0.09 | | 0.20 | 0.004 | | 0.0079 |
| D | 9.6 | 9.7 | 9.8 | 0.378 | 0.382 | 0.386 |
| E | 6.2 | 6.4 | 6.6 | 0.244 | 0.252 | 0.260 |
| E1 | 4.3 | 4.4 | 4.48 | 0.169 | 0.173 | 0.176 |
| e | | 0.65 BSC | | | 0.0256 BSC | |
| k | 0° | | 8° | 0° | | 8° |
| L | 0.45 | 0.60 | 0.75 | 0.018 | 0.024 | 0.030 |

SYSTEM AND METHOD FOR ELECTRONIC AUTOMATED PRINTED CIRCUIT DESIGN

CROSS-REFERENCE TO RELATED APPLICATIONS

This application claims priority to U.S. Provisional Application Ser. No. 62/528,605, filed on Jul. 5, 2017, the contents of which are incorporated herein in its entirety.

BACKGROUND

Electronic design automation (EDA) is a category of software tools for designing electronic systems, such as printed circuit boards and integrated circuits. The tools work together in a design flow that chip designers use to design and analyze entire semiconductor chips. EDA is also referred to as electronic computer-aided design (ECAD).

For such EDA, we concern ourselves here with the PCB design flow rather than integrated circuits. Known printed circuit board (PCB) design flow typically consists of two major steps: (1) schematic capture and (2) PCB layout.

Schematic capture refers to "drawing the schematic." Integrated circuits, connectors, discrete components, and other components are represented by symbols and are interconnected via wires or conductive traces on the PCB. The schematic describes the connectivity between parts, and not physical attributes (e.g., not part placement or wire lengths). FIG. 2A shows an example of a symbol for a commercially available integrated circuit or "chip" labeled as U8, which may be used on a printed circuit board and connected to other chips on the PCB.

PCB layout refers to "drawing the printed circuit board." In this process, the component's physical location on the PCB is specified and the wires (i.e., the location of conductive copper or metal traces) are placed. Each part is represented by its footprint, which describes where copper (conductive metal) needs to be positioned so that the part can be soldered to the PCB. This copper can be in the form of "pads," and may include drill locations or "holes" to be drilled in the PCB. FIG. 2B shows an example of the part labeled as U8 and the associated trace wiring.

At a minimum, each symbol requires the following information:
(1) Pin numbers (e.g., the symbol in FIG. 2A has pins numbered 1-28)
(2) Pin names (e.g., C1+, C1−, T1IN, T2IN, etc.), and
(3) Mapping between pin numbers and pin names.

At a minimum, each footprint needs:
(1) Pad locations (i.e., where copper traces should be located for connection to the corresponding pins, including position, orientation, and size.)
(2) Pin numbers.
(3) Mapping between pad locations and pin numbers.

The symbol and footprint are often packaged together in a parts library. Note that the pin number is shared between the symbol and the footprint. This allows the schematic capture and PCB layout software to coordinate and verify that the copper trace connections on the PCB match the wire connections on the schematic.

In addition to schematic capture and PCB layout software, EDA packages often include library editors. These commercially available programs facilitate the manual entry of symbols and footprints. Technicians or "librarians," create symbols and footprint (see FIGS. 3 and 4), typically using the part's corresponding PDF datasheets. Some EDA parts are available from the manufacturers, but more often, such parts must be manually created from the manufacturer's datasheets. This manual creation process is time consuming, labor-intensive, costly, and frequently error-prone.

SUMMARY

This document describes a system and method to create schematic symbols and PCB footprints directly from the manufacturer's PDF datasheets. These symbols and footprints are used as part of an Electronic Design Automation (EDA) tool or software package, such as, for example Altium Designer, commercially available from Altium Corp. As part of the EDA process, the designer connects parts (e.g., the integrated circuits, discrete components, connectors etc.) with wire traces on the PCB. In the EDA software, these parts are represented on the schematic diagram by symbols, and on the PCB by footprints.

Embodiments of the present invention generate EDA parts (symbols and footprints) directly from the manufacturer's Portable Document Format (PDF) datasheets, largely eliminating a manual step in the EDA flow, and are directed to generating symbols and footprints for integrated circuits, discrete components, connectors, bulk components, and the like. To extract the part's symbol, the system (1) leverages computer vision to detect symbol-like objects, (2) extracts text and probabilistically assigns pin names and numbers, and (3) iteratively optimizes to find a candidate set of pin name number matches.

To extract the part's footprint, the system (1) detects footprint-like objects in the PDF, (2) detects repetitive pad-like shapes within the footprint, (3) extracts physical sizes from dimension-lines and tables, and (4) probabilistically optimizes over the repetitive detections to find a candidate set of pad placements.

Both symbol and footprint creation (1) may rely on machine learning and image detection techniques to identify objects within the PDF, (2) optimize to find a set of most likely solutions, and (3) present the user with a set of best choices from which the correct symbol/footprint can be chosen. The user can then extract the part to a number of popular EDA package file formats.

In one specific embodiment, a method for generating an electronic component symbol and a corresponding component footprint for use in a printed circuit board design tool includes providing a plurality of training datasheets corresponding to a plurality of components; learning, during off-line symbol processing, to identify component symbols based on the training datasheets to identify symbol characteristics, including pin names and pin numbers corresponding to the component symbols in the plurality of training datasheets, and storing in memory the identified symbol characteristics.

The method further includes learning, during off-line footprint processing, to identify component footprints based on the training datasheets to identify footprint characteristics, including pad locations and dimension lines corresponding to the component footprints in the plurality of training datasheets, and storing in the memory the identified footprint characteristics.

Once training has been performed, the method includes providing a selected component datasheet containing a component to use in the printed circuit board design tool, extracting a component symbol of the selected component datasheet during on-line symbol processing based on the learned symbol characteristics, and extracting a component footprint of the selected component datasheet during on-line footprint processing based on the learned footprint characteristics.

After on-line processing has been completed, the method merges the extracted component symbol and the extracted component footprint to generate a completed component corresponding to the selected component, and provide the completed component to the printed circuit board design tool.

BRIEF DESCRIPTION OF DRAWINGS

FIG. 3 is an example of a symbol of an integrated circuit from a manufacturer's PDF datasheet for the known part of FIG. 2A.

DETAILED DESCRIPTION

Figure 1:
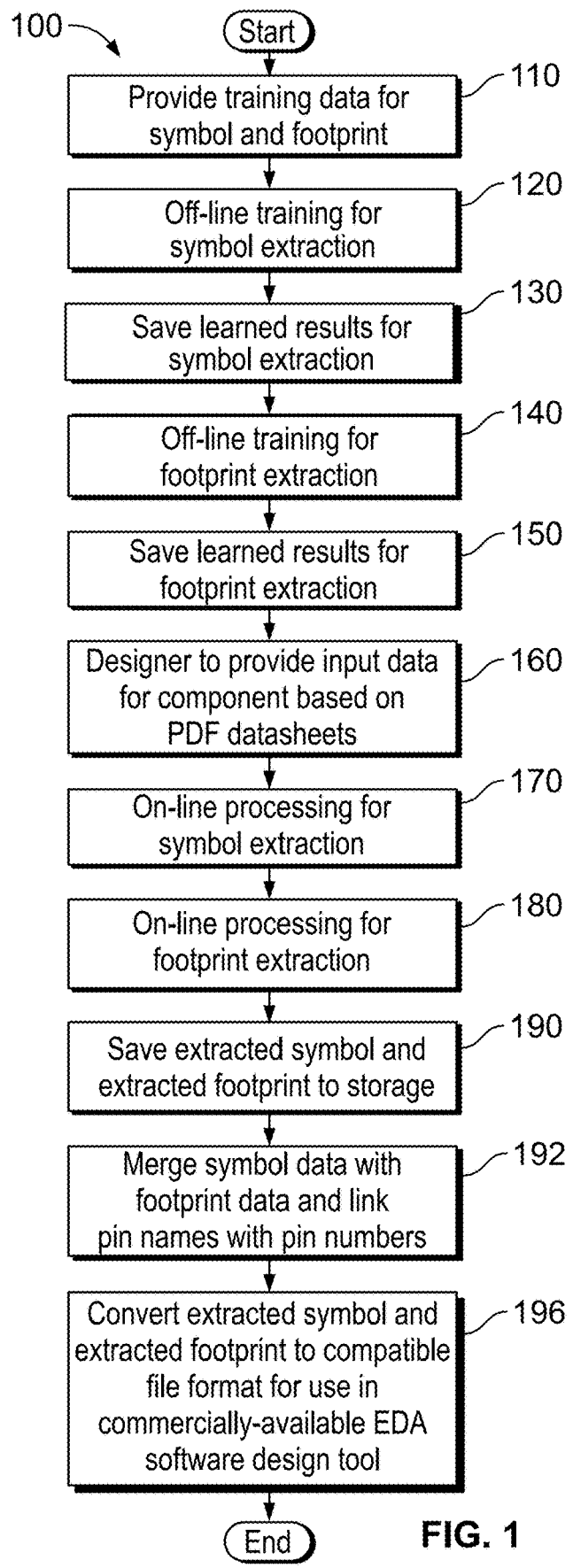
FIG. 1 is a high-level overall flowchart for a system and method for automatic printed circuit design.

Referring now to FIG. 1, a system and method 100 for automated electronic part creation for printed circuit board design is shown, and will be described below as a general overview of processing. The system 100 is initially provided with training data for symbols and footprints 110 corresponding to a plurality of components or chips, in the form of PDF datasheets, and in some embodiments, annotations to the datasheets as well. Note that embodiments of the invention are not limited to PDF format only. For example, any suitable data format may be used, such as JPEG, TIFF, SVG format, and the like. Next, off-line training processing for symbol extraction 120 is performed, and the results are saved 130. This is shown in greater detail in FIG. 14. Preferably, off-line training for symbol extraction 120 is performed by a symbol extraction training engine for use off-line from the EDA software tool, which may be a specialized processor purposefully configured for this task.

Similarly, off-line training or learning processing for footprint extraction 140 is performed, and the results are saved 150. This is shown in greater detail in FIG. 16. It is immaterial whether the symbols are processed first or the footprints are processed first, and such off-line processes can be performed in any order. Preferably, off-line training for footprint extraction 140 is performed by a footprint extraction training engine for use off-line from the EDA software tool, which may be a specialized processor purposefully configured for this task.

Next, after both off-line processes 120, 140 have been completed, the designer provides data input for processing 160, in the form of new PDF datasheets for a component or chip. In some embodiments, the new PDF datasheets may be provided automatically without specific user intervention based on a "parts list" or other data file of the EDA system. After the designer or the data file has provided the input data, on-line processing for symbol extraction 170 and on-line processing for footprint extraction 180 are performed, shown in greater in FIGS. 15 and 17, respectively. Again, it is immaterial whether the symbols are processed first or the footprints are processed first during such on-line processing, and such processes can be performed in any order. Preferably, on-line processing for symbol extraction 170 is performed by a symbol extraction engine for use on-line, which may be a specialized processor purposefully configured for this task. Similarly, on-line processing for footprint extraction 180 is performed by a footprint extraction engine for use on-line, which may be a specialized processor purposefully configured for this task.

After on-line processing steps 170, 180 are complete, the results are saved 190. Next, to make a complete part, the symbol data and the footprint data are merged, and the pin names are linked with the pin numbers 192. The results of this final step represent the complete symbol and footprint corresponding to the designers selected or new chip for use in the PCB design. As an optional step, the final result or output may be converted 196 into a suitable format for use in various commercially-available EDA software tools, if necessary.

I. Symbol: Off-Line Training for Symbol Extraction—Overview

Figure 14:
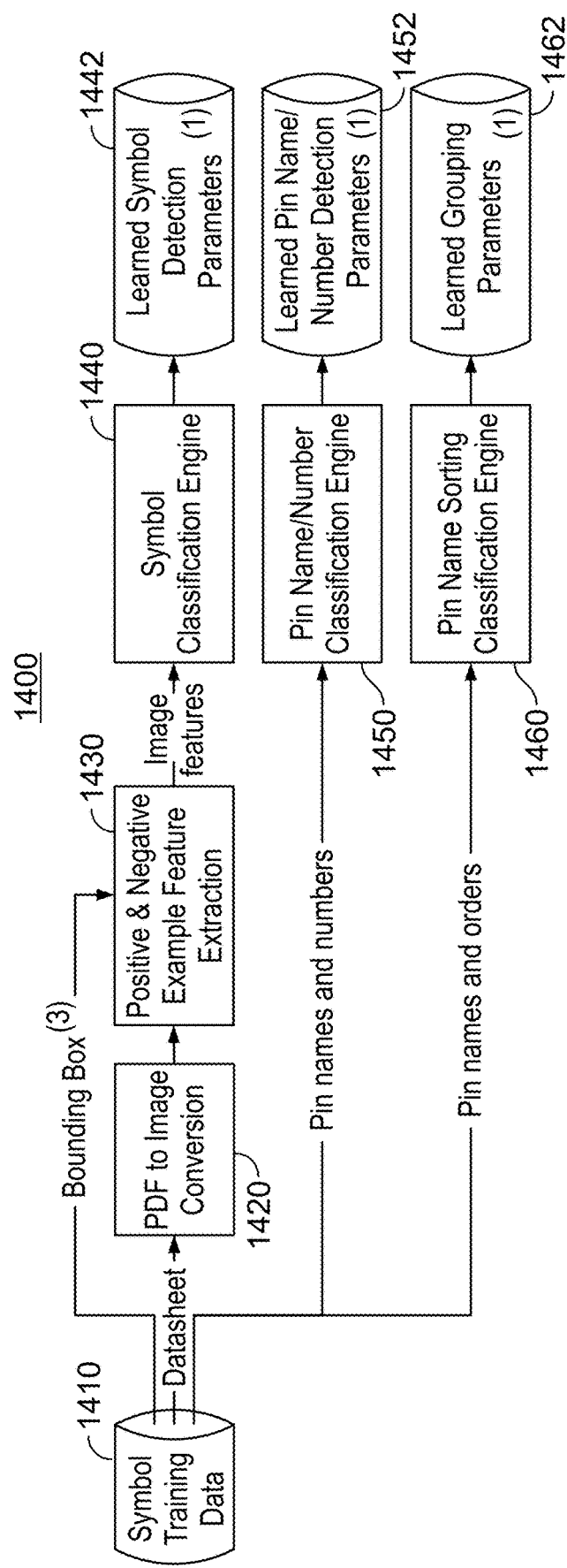
FIG. 14 is a flowchart illustrating off-line training flow for symbol extraction, including generation of distinct characteristics of symbols and pin names/numbers, which have been learned from annotated data sets and stored, according to one embodiment.

FIG. 14 shows a flow chart for off-line training for symbol extraction 1400, also referred to interchangeably as off-line processing for symbol extraction, which generates distinct characteristics of symbols and pin names/numbers, which are learned from annotated data sets and are stored for later use. The annotated data sets, referred to as symbol training data 1410, are composed of the manufacturer's PDF datasheets and known symbol extractions. Data may be stored locally, in the cloud, in a remote server, in a library, or in any suitable storage, for example, the hard disk 1818 of FIG. 18.

The off-line training for symbol extraction 1400 is performed once, and the results thereof are stored and reused for every PDF image introduced by the designer during on-line processing for symbol extraction 1500, corresponding to a selected component to be included in the PCB design. Thus, once the system has been trained during off-line processing for symbol extraction 1400, on-line processing for symbol extraction 1500 of FIG. 15 can extract the symbol for a particular integrated circuit, chip, discrete component, connector, and the like, directly from the manufacturer's PDF datasheet, even though the processing of FIG. 15 has never encountered or "seen" that manufacturer's PDF datasheet before for that selected component.

Of course, there may be some overlap between the off-line training datasheets and a "new" datasheet selected by the designer for use in the EDA tool. In one embodiment, the selected datasheets may be mostly new component datasheets and may be greater than 99% new. This means that in a preferred embodiment, roughly only 1% of the selected datasheets, for example, may have been previously used during off-line training. In other words, the plurality of training datasheets used during off-line processing is typically less than 1% of all datasheets, where "all datasheets" means datasheets corresponding to all available components for use in the various EDA systems that may be used generally in the EDA system environment. This may be a very large number, and could correspond to several million components. In some embodiments, as a practical matter, off-line training or learning may be completed using one-thousand to three-thousand datasheets. Note that any suitable percentage of "all available component datasheets" may be used during the off-line training or learning for symbol and footprint extraction, such as between 0.1% to 40% of the total number of available datasheets.

This represents a huge savings in terms of cost, time, and efficiency for the EDA designer because it significantly reduces the work required to enable the EDA system to utilize the various components without the need to enter corresponding data for an otherwise "new" component. However, any suitable percentage of the available component datasheets may be used during the training process, such as between 1% and 70% of all of the available component datasheets.

Generally, off-line processing for symbol extraction 1400 may leverage machine learning techniques to learn characteristics of symbols and provide a parameter set which encodes "what a symbol looks like in a PDF." For example, the top half of FIG. 3 would be selected, but the bottom half would not. The text of pin names and numbers has distinct characteristics, and the corresponding learned parameters encode "what text looks like for a pin name/number." For example, the text "Vcc" is likely to be a pin name, but the text "configuration" is not.

The symbol training data 1410 may include PDF datasheets for a plurality of chips or components, and may range from a few dozen PDF pages to a few thousand PDF pages. The PDF datasheets for several hundred different chips may be included in the symbol training data 1410.

Although PDF datasheets for a typical chip may typically be about 10 to 20 pages in length, the pertinent data for each different chip is typically located on one or two pages. For example, the symbol may be shown on one page while the corresponding footprint may be shown on a second page. In another embodiment, the symbol and the footprint may be shown on a single page. Considering the vast number of different semiconductor components or chips or even discrete components available to the PCB designer, the symbol training data 1410 represents an extremely small percentage of the available datasheets.

Note that the symbol training data 1410 for off-line symbol extraction processing 1400 is drawn from the same or similar distribution as that of the unknown or new input data, referred to as "symbol design input data" 1510 processed during on-line processing for symbol extraction 1500.

Thus, there are basic similarities or characteristics in common between the symbol training data 1410 and the symbol design input data 1510 in terms of format or "look and feel," generally. Also note that the symbol training data 1410 not only includes the collection of PDF datasheets, but may also include human annotated labeling that indicates the page, and where on the page the symbol is located.

II. Symbol: Off-Line Training for Symbol Extraction—Detail

Still referring to FIG. 14, each of the processing sections or modules for off-line training for symbol extraction 1400 will be discussed below.

PDF to image conversion 1420 "flattens" the PDF document, which is inherently a layered vector document. This in particular does not reduce text to image data, as it is preferred to isolate that text as "plain text" and not as an image.

Positive and Negative Feature Extraction 1430 establishes a bounding box 1210 (see FIG. 12) to identify on what page and where on the page of the symbol training data 1410 the component symbol is located. In some embodiments, the human operator may determine the bounding box 1210. However, because off-line training for symbol extraction 1400 is performed only once, human intervention at this initial stage in not onerous. Note that some components are sufficiently similar such that multiple symbols and footprints may be specified in a single PDF datasheet. There is no significant difference in processing, but it is possible that (1) there could be more than one symbol in a datasheet, (2) there may be more than one footprint in a datasheet, and (3) that one symbol may be associated with multiple footprints.

The bounding box 1210, may be for example, 100 pixels by 500 pixels. However, any suitably sized bounding box may be established depending on the dimensions of the PDF datasheets representing the symbol training data 1410. All information within the bounding box 1210 may be considered to be "positive" training data, and everything outside of the bounding box may be considered to be "negative" training data. Next, further sub-regions or small rectangles of data within the positive training data may be sampled randomly in some embodiments, as described below.

Symbol Classification Engine 1440 processes the data from the sub-regions or small rectangles of data within the positive and negative training data area described above. The symbol classification engine 1440 learns the difference or the distinction between positive training data and negative training data using a machine learning technique (e.g., a Cascade Classifier or Neural Network, both of which are discussed in greater detail below). Machine learning techniques establish a model with some unknown parameters. The model provides a general framework for the solution, and the machine learning algorithm searches for values for the unknown parameters that produce the best performance.

This search procedure is an optimization routine, using so-called Boosting (for Cascades) or back-propagation (for Neural Networks). In the case of Cascades, for example, sub-regions or small rectangles of data are considered and the symbol classification engine determines a score corresponding to how likely or what the probability is that the data within that sub-region is, in fact, part of a symbol, as opposed to not being part of a symbol. Sub-regions are ranked, and their scores selectively combined to yield the best performance on the training data. The output of the symbol classification engine 1440 is a set of learned symbol detection parameters 1442, which exhibited the best performance (i.e., correct discrimination of positive and negative training images), which will preferably yield the best performance for on-line data.

Often, learned parameters will not have a human-interpretable meaning. Indeed, the only meaning for the parameters is that they result in the best performance. This is often the case for Neural Networks where the parameters are matrices indicating weightings and different levels of the hierarchy. In the case of Cascade Classifiers, the learned parameters are sub-regions of the image and importance weightings. We generally expect that intuitively relevant parts of the image will receive higher weightings, but human intuition is not always consistent with the cascade's learned parameters. For example, we might expect that the right angles of the pins in a symbol might be important for classification; we expect to see a few important sub-regions which highlight such right angles. As an analogy, consider Cascade Classifiers for face detection in portable cameras. The sub-regions of these algorithms often include the eyes and mouth, prominent indicators of a face.

Pin Name and Pin Number Classification Engine 1450 performs processing similar to that of the symbol classification engine 1440 using similar techniques. However, the pin name and pin number classification engine 1450 may be limited to processing only areas of the data that correspond to the pin name and pin number, as set forth by the corresponding bounding boxes. In this process, the pin name and pin number classification engine 1450 learns what constitutes a pin name, and what constitutes a pin number. In some cases, determining what constitutes a pin number may be somewhat less complex than determining what constitutes a pin name because pin numbers can be limited to digits, typically from 1 to 40, of course for a 40 pin chip. The pin name and pin number classification engine 1450 may determine such pin numbers for chips of any available size, such as 8 pin, 14 pin, 28 pin, 64 pin and the like. Some chip packages, for example, Ball Grid Arrays, assign a letter/number combination to indicate a row/column as the pin "number." For example, pin number "B3" would be the pin on the second row and third column in the array. The output of the pin name/number classification engine 1450 is a set of learned pin name/number detection parameters 1452.

Names of the pins, such as Vcc, Vss, Gnd, and the like, are also determined. In that regard, pin names and pin numbers are based on the previously stored symbol training data 1410 generated during off-line training for symbol extraction 1400, are classified. The results of such classification include details and examples of what is considered to be a pin number, what is not considered to be a pin number, what is considered to be a pin name, and what is not considered to be a pin name, which essentially correspond to the learned pin name-pin number detection parameters 1452, which may be stored in memory or permanent storage.

The symbol training data 1410 may include lists of strings. One list of strings is a sampling of pin names (e.g., a text file of known pin names extracted from datasheets). Another list is a sampling of pin numbers (e.g., a text file of known pin numbers extracted from datasheets). The Pin Name/Number Classification Engine 1450 trains a set of parameters which accept a string as input and outputs a decision about whether it is a pin name, pin number, or neither. In a neural network implementation, for example, these parameters 1452 consist of (1) an embedding layer which maps each character of the string to a different dimension and (2) a deep neural network consisting of multiple layers and several dozen parameters.

Pin Name Sorting Classification Engine 1460 trains a sorting classifier to arrange pin names on the symbol. For example, pins with names "A0", "A1", "A2", etc. are generally expected to be adjacent to each other on the symbol. In the same respect "TX" and "RX" are often adjacent. This engine 1460 trains a binary classifier which, given two strings A, B outputs a 1 if A should be before B or a 0 if A should be after B. The output of the pin name sorting classification engine 1460 is a set of learned grouping parameters 1462.

The Symbol Training Data 1410 includes known examples of pin orderings from datasheets. In the case of a neural network, the output parameters 1462 would consist of (1) an embedding layer and (2) a deep neural network consisting of several dozen parameters.

Note that the learned symbol detection parameters 1442, the learned pin name/number detection parameters 1452, and the learned grouping parameters 1462 are preferable saved in computer memory, or in a local storage, or in a remote database, and may be saved in any suitable data file format that can represent collections of matrices and other data.

III. Symbol: On-Line Processing for Symbol Extraction—Detail

Figure 15:
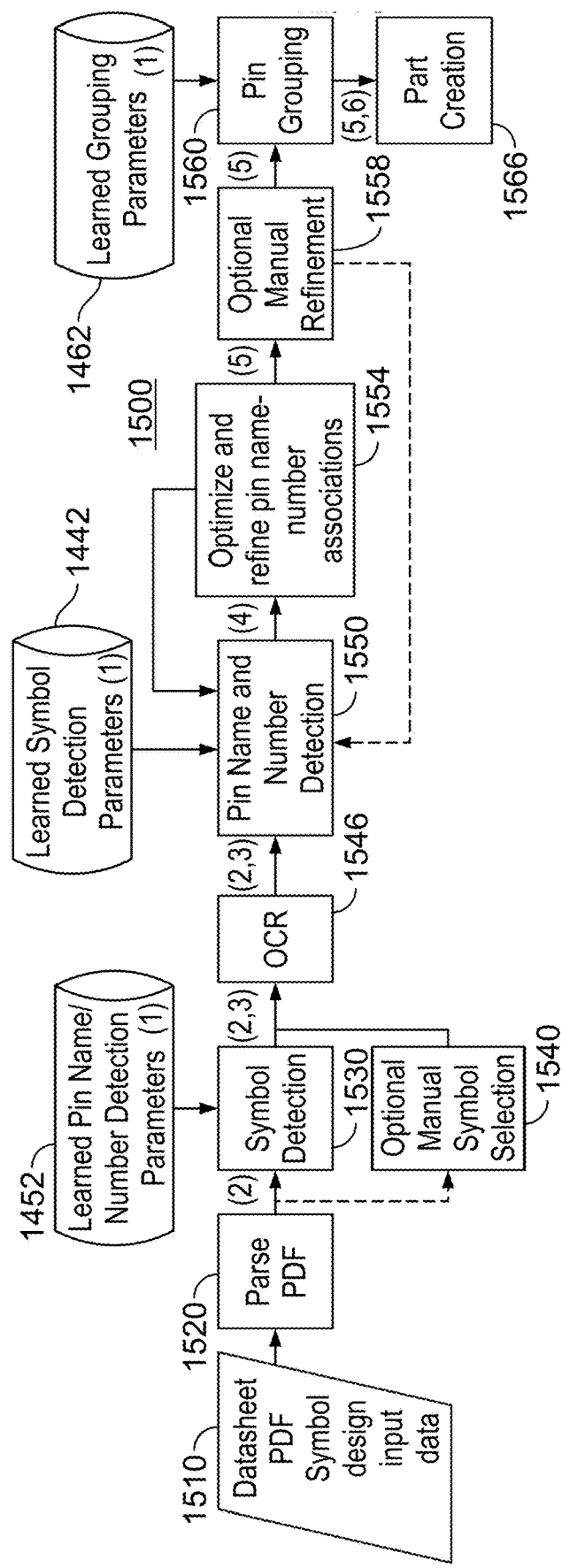
FIG. 15 is a flowchart illustrating on-line processing for symbol extraction, which flow begins with a datasheet in PDF format and creates a part that can be loaded directly into Cadence, Altium, Eagle, Mentor Graphics, or other commercially available EDA products. Optional manual steps are shown in dashed lines, according to one embodiment.

Referring now to FIG. 15, each of the processing engines or modules of on-line symbol extraction 1500 will be discussed detail. On-line symbol extraction 1500 processing is applied to each PDF document corresponding to the symbol design input data 1510, which the designer selects for use in the PCB design. Processing begins with receiving the datasheet in PDF format selected by the designer, and creates a part which can be loaded directly into the various EDA commercially available software products, such as, Cadence, Altium, Eagle, Mentor Graphics, and the like. Processing may include PDF parsing 1520, symbol detection 1530, manual symbol selection 1540, optical character recognition 1546, pin name/pin number detection 1550, optimization and refinement of pin name/number 1554, manual refinement 1558, pin grouping 1560 and part creation 1566.

Manual symbol selection 1540 and manual refinement 1558 are optional manual steps, and dashed lines show related iterative flow. Although most or all of the on-line symbol extraction 1500 processing is automatic, in some embodiments, the user is provided with opportunities to correct system errors or ambiguities and provide guidance if deemed desirable depending on the application and specific PCB design requirements.

The input to on-line processing for symbol extraction 1500 is the PDF datasheet, which the designer wishes to use in the PCB design, and which may be "new" to the on-line processing for symbol extraction 1500. In other words, this may be a completely new component or chip that the PCB designer has selected, and which the system has never encountered before.

Learned pin name-number detection parameters 1452 are provided to symbol detection processing 1530 by the previously executed off-line training for symbol extraction 1400, and include the learned pin name parameters and the learned pin number parameters. Learned symbol detection parameters 1442 are provided to pin name and pin number detection processing 1550 by the previously executed off-line training for symbol extraction 1400. Finally, learned grouping parameters are provided to pin grouping processing 1560 by the previously executed off-line training for symbol extraction 1400.

Figure 5:
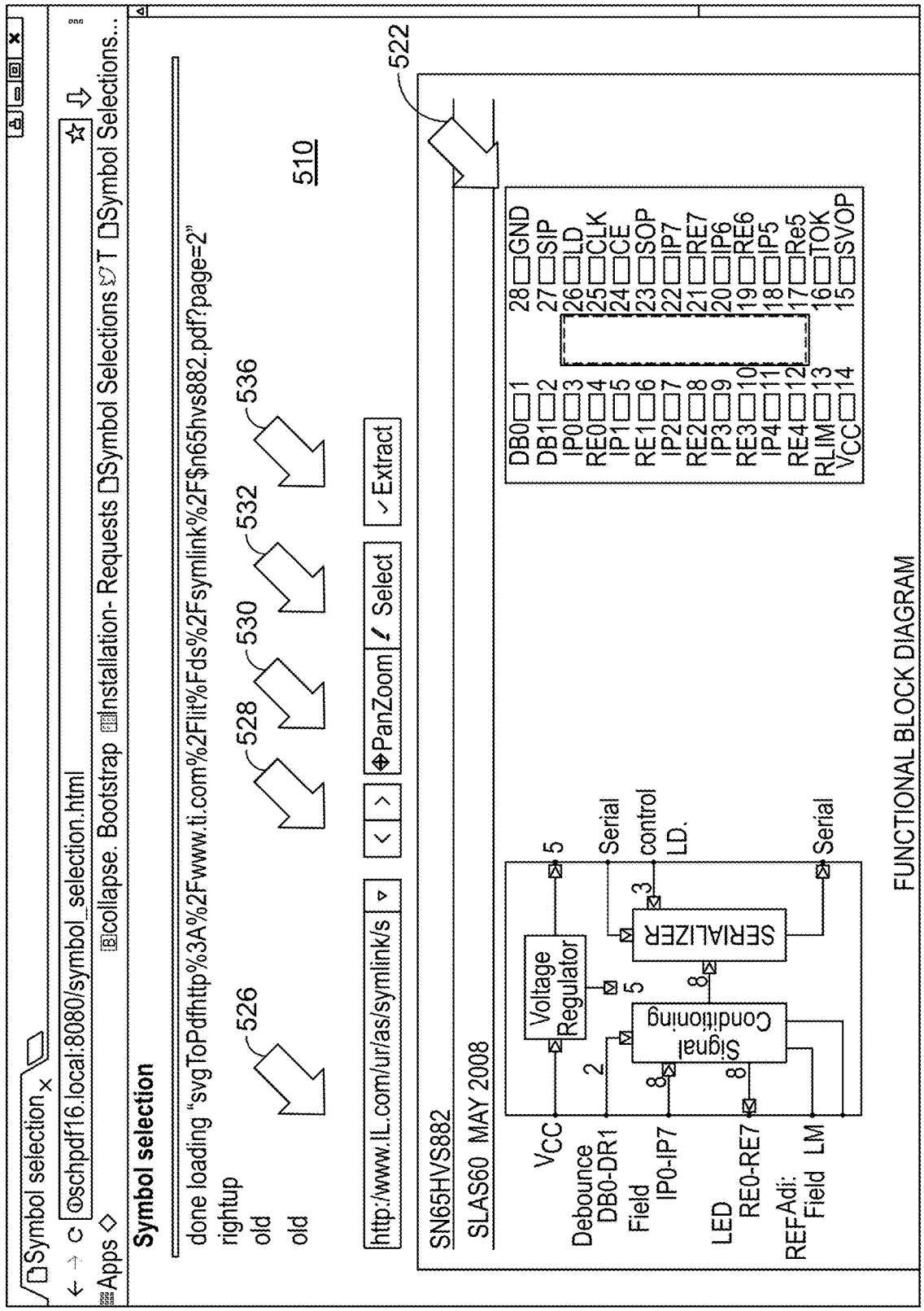
FIG. 5 is a screen shot of a symbol selection web interface, according to one embodiment.

The user may interact with the system 100, and in particular with on-line processing for symbol extraction 1500, via a web front-end or web interface 510, as shown in FIG. 5, described in greater detail below.

Still referring now to FIG. 15, each of the processing sections of on-line symbol extraction 1500 will be discussed as follows. This process occurs on-line and in real time.

Parse PDF 1520 parses the PDF document 1510 (the symbol design input data) and flattens the graphical elements. This produces an in-memory representation of what the user would see on the screen. Similar to the processing for PDF to image conversion 1420, this process also "flattens" the PDF document, which is inherently a layered vector document. Similarly, parse PDF 1520 does not reduce text to image data, as it is preferable to isolate that text as "plain text" and not as an image.

Symbol Detection processing 1530 uses the learned parameters (learned pin name/number detection parameters) 1452 to process each page in the PDF datasheet, also referred to as the symbol design input data 1510. Symbol detection processing 1530 selects the most likely locations of the symbol in the PDF datasheet. Recall that a particular PDF datasheet of interest to the PCB designer may be several pages to tens of pages in length, and symbol detection processing 1530 attempts to automatically locate and identify where the component symbol is located among the multiple PDF pages, based on the learning that was performed only one time during off-line processing for symbol detection 1400.

It would not be feasible in terms of time, computational usage, and cost, to run an equivalent of off-line processing for symbol detection for every new symbol encountered during the PCB design process. This module 1530 may return multiple results as there may be multiple symbols in the PDF in the symbol design input data 1510, and some detections may be erroneous.

Manual Symbol Selection processing 1540 is an optional step that may be performed if the results of symbol detection processing 1530 are not satisfactory. The user can bypass or augment symbol detection processing 1530 or correct errors by manually selecting a bounding box 520 via the web interface 510. This bounding box selects the page and region of interest for further processing. In that regard, the user may physically draw the bounding box on the screen to identify the actual symbol for further processing. Once the user has performed this optional processing 1540, on-line processing for symbol extraction 1500 continues to the next processing step.

OCR processing 1546 is next performed. In that regard, some PDF documents may store text as image data rather than actual textual data, and in such instances, optical character recognition (OCR) may be performed to convert such text images back into understandable or computer readable text. This specific OCR processing 1546 is unique in that it must recognize text at various orientations because the datasheet text is often rotated, and the text is rarely in the form of complete sentences (i.e., sentence context may not be available here, but is often used to assist in OCR). Thus, OCR processing 1546 is able to convert pin numbers and pin names into actual text where such pin numbers and pin names are in the form of image data and may be received in any orientation.

Pin Name and Number Detection processing 1550 receives from the OCR processing 1546 a plurality of text characters within a bounding box, which identifies and isolates the chip symbol. Such text characters may correspond to pin names, such as, CLK, VCC, GND, CS, ADDR0, and the like, and pin numbers, such as 1, 2, 3, A1, B1, and the like. In some cases, any digit-only strings can be assumed to be pin numbers and the remaining strings assumed to be pin names. In other cases (e.g., ball grid array (BGA) packages), pin numbers must be inferred from grid locations.

The learned symbol detection parameters 1442 provide the pin name and number detection processing 1550 with probabilities about how likely a text string is to be a pin name or number. Importantly, the system allows that this detection process 1550 may produce false positives. For example, pin name and number detection processing 1550 may return too many pin names, some of which may be incorrect. Superfluous or erroneous pin names and numbers may be discarded by the optimizer 1554. In some embodiments, this allows for some error in the system, and subsequent processing steps preferably refine the results.

Optimize And Refine Pin Name-Pin Number Association processing 1554 attempts to associate every pin name with its corresponding pin number, and represents the kernel allowing the symbol to be generated. Because prior phases return potentially noisy results (e.g., wrong pin number or too many pin names), this processing step 1554 preferably filters through the inputs and produces a candidate set of most likely pin name-number associations. An iterative optimization may be used, which alternates between discrete matching (e.g., Hungarian algorithm) and non-linear LM optimization. The optimize and refine pin name-pin number association processing 1554 outputs several candidate solutions, each scored by how likely the system "thinks" it is to be the "right" match.

To visualize the results of this processing 1554, FIG. 3 (upper pane) shows the chip pin configuration with pin names outside the chip outline, and pin numbers inside the chip outline. The correct pin name must be associated with the correct pin number. Extraneous marking or text within the PDF figure may cause errors, which may be iteratively corrected.

Manual Refinement processing 1558 may further process the pin name/pin number associations provided by the optimize and refine pin name-pin number association processing 1554, and may convert the associations into a graphic representative of the symbol. The web interface 510 may allow the user to manually adjust and modify the results and view a plurality of alternative candidate solutions, as described in greater detail below. A plurality of alternative candidate solutions may be provided to the user, in order of highest probability of correctness.

Pin Grouping processing 1560 automatically associates pin numbers that are typically associated manually by a human librarian in known systems. The need for a human librarian is a significant drawback in known EDA design systems because an inordinate amount of time is needed to correctly specify the symbol and footprint of each and every chip or component that the designer may select for inclusion in the design.

Figure 2A:
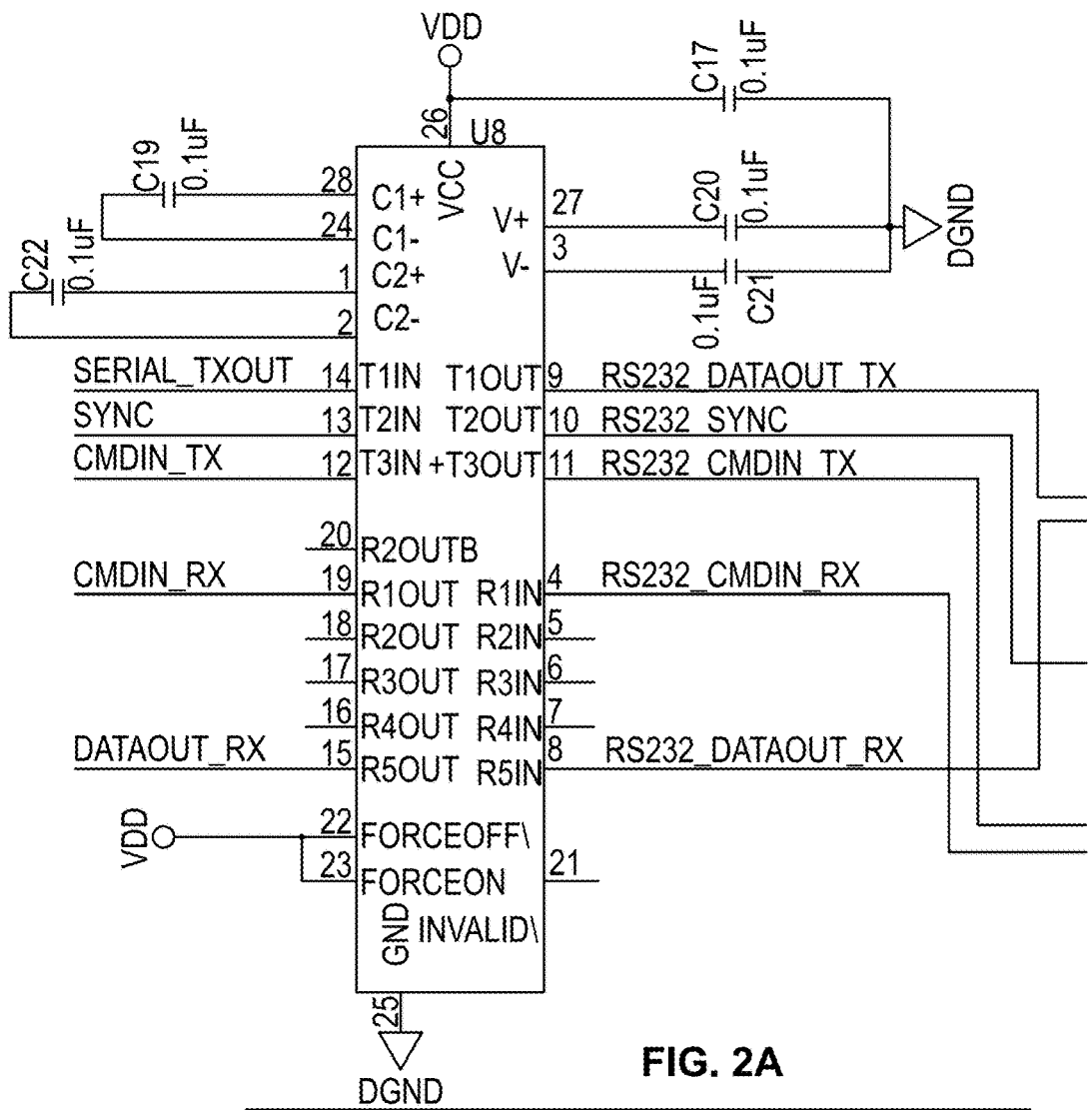
FIG. 2A is an example of symbol for a known part or integrated circuit.
Figure 2B:
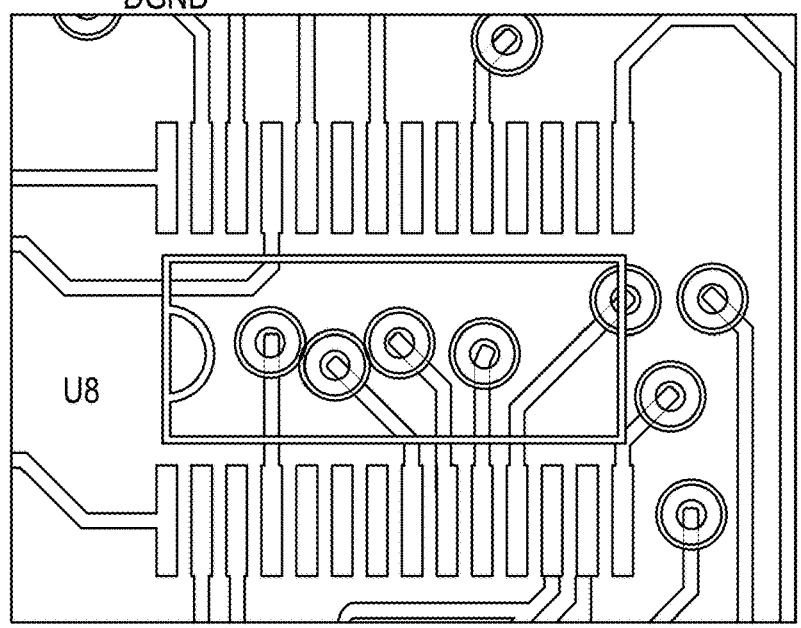
FIG. 2B is an example footprint of the known part of FIG. 2A.
Figure 4:
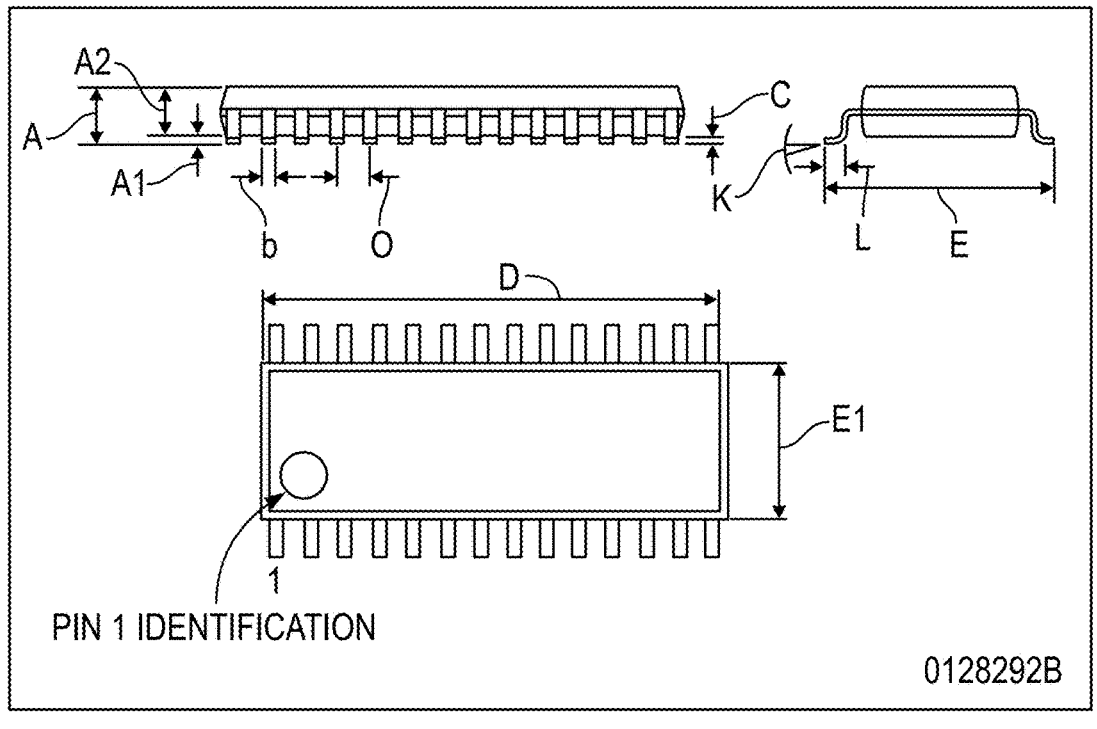
FIG. 4 is an example of footprint from an integrated circuit part from a manufacturer's PDF datasheet for the known part of FIG. 2A.

The ordering of pins in the graphic representative of the symbol is often different from that shown in the PDF datasheet or the footprint. This ordering often groups pins by function. For example, in FIG. 2A, the pin "C1+" and "C1−" are adjacent, but they are not necessarily adjacent in either the symbol shown in FIG. 3 or the footprint shown in FIG. 4, where FIG. 3 and FIG. 4 represent the same chip or component. The algorithm associates pins that are typically associated by the human librarians.

Part Creation processing 1566 is the final stage in on-line processing for symbol extraction 1500. The symbol representing the part is extracted from an internal format from storage to generate an output file, which output file is compatible with and can be loaded by a plurality of popular commercially available EDA software packages.

Note that before the output of the system 100 is usable, both symbol processing 1400, 1500 and footprint processing 1600, 1700 must be complete. In that regard, as described above with respect to FIG. 1, the order of completion for symbol processing 1400, 1500 and footprint processing 1600, 1700 is immaterial as long as both processes have finished. Upon completion of symbol processing 1400, 1500 and footprint processing 1600, 1700, the part creation processing will merge the symbol data with the footprint data and link the pin names with the pin numbers. The final output may then be converted, if needed, into the specific format required by the EDA software package. Such output then represents a completed part ready to use in the commercially-available software package by the designer.

IV. Footprint: Off-Line Training for Footprint Extraction—Overview

Figure 16:
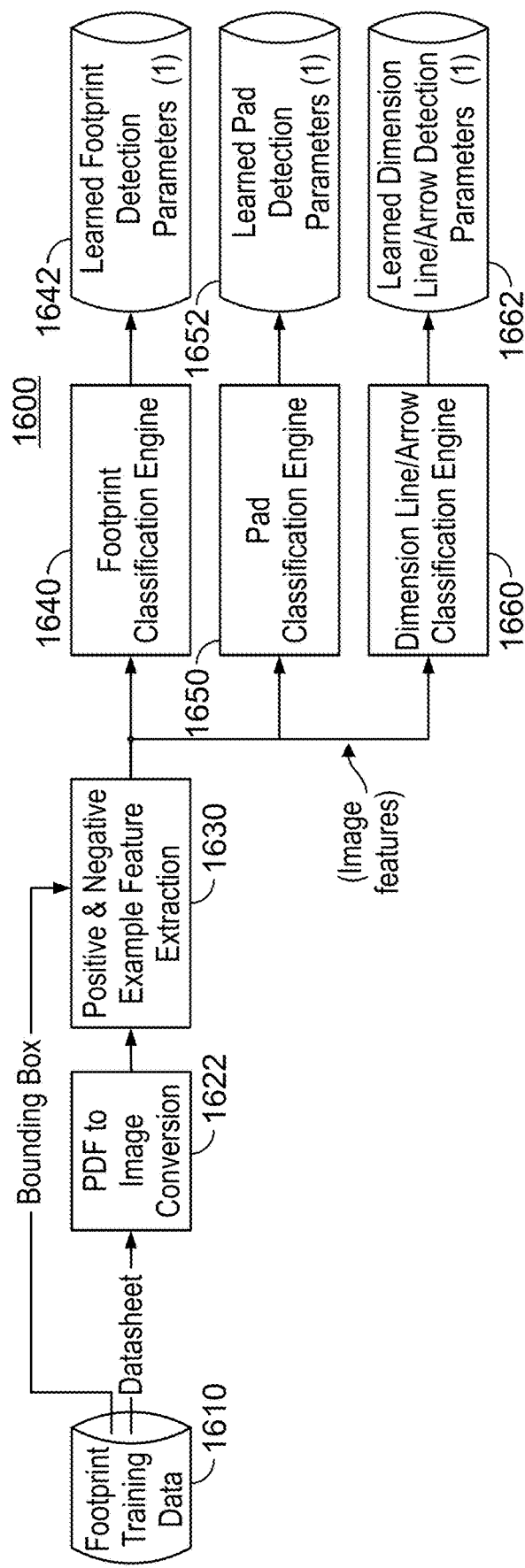
FIG. 16 is a flowchart illustrating off-line training flow for footprint extraction, where distinct characteristics of symbols, pads, and dimension-lines are learned from annotated data sets and stored, according to one embodiment.

FIG. 16 shows a flow chart for off-line training for footprint extraction 1600, which generates distinct characteristics of footprints, which are learned from annotated data sets and are stored for later use. The annotated data sets, referred to as footprint training data 1610, are provided by a plurality of manufacturer's PDF datasheet. Data may be stored locally, in the cloud, in a remote server, in a library, or in any suitable storage, for example, the hard disk 1818 of FIG. 18.

The off-line training for footprint extraction 1600 is performed once, and the results thereof are reused for every PDF image during on-line processing for footprint extraction 1700 corresponding to a selected component to be included in the PCB design. Thus, once the system 100 has been trained during off-line processing for footprint extraction 1600, on-line processing for footprint extraction 1700 of FIG. 17 can extract the footprint for a particular integrated circuit or chip directly from the manufacturer's PDF datasheet, even though the processing 1700 of FIG. 17 has never encountered the manufacturer's PDF datasheet for that selected component before.

Generally, off-line processing for footprint extraction 1600 leverages machine learning techniques to learn characteristics of footprints, and provides a parameter set which encodes "what a footprint looks like in a PDF." For example, the bottom half of FIG. 4 would be selected as corresponding to a footprint, but the top half would not be selected. The dimensions and distances between pins of the chip are discussed later.

The footprint training data 1610 may include PDF datasheets for a plurality of chips or components, and may range from a few dozen PDF pages to a few thousand PDF pages. The PDF datasheets for several hundred different chips may comprise the footprint training data 1610. Considering the vast number of different semiconductor components available to the PCB designer, the footprint training data 1610 represents an extremely small percentage of the available datasheets.

Note that the footprint training data 1610 for footprint extraction processing 1600 is drawn from the same or similar distribution as that of the unknown or new footprint design input data 1710 processed during on-line processing for footprint extraction 1700.

Thus, there are basic similarities or characteristics in common between the footprint training data 1610 and the footprint design input data 1710 in terms of format or "look and feel" generally. Also note that the footprint training data 1610 not only includes the collection of PDF datasheets, but also includes human annotated labeling that indicates the page and where on the page the footprint is located.

V. Footprint: Off-Line Training for Footprint Extraction—Detail

Referring to FIG. 16, each of the processing sections or modules for off-line training for footprint extraction 1600 will be discussed below. Off-line training for footprint extraction 1600 proceeds in a similar way as off-line training for symbol extraction 1400. Off-line training for footprint extraction 1600 as shown in FIG. 16 identifies distinct characteristics of symbols, pads, and dimension-lines, which are learned from annotated data sets and stored for later use. The goal is to learn what image features are common to footprints, pads (solder locations for the physical part), and dimension-lines (specify physical dimensions of the footprint), as shown in FIG. 16.

PDF to image conversion 1620 "flattens" the PDF document, which is inherently a layered vector document. This in particular does not reduce text to image data, as it is preferred to isolate that text as "plain text" and not as an image. Processing is the same as or is similar to PDF to image conversion 1420 of FIG. 14.

Positive and Negative Feature Extraction 1630 establishes a bounding box 1210 (see FIG. 12) to identify on what page and where on the page of the footprint training data 1610 the component footprint is located. In some embodiments, the human operator may determine the bounding box 1210. However, because off-line training for footprint extraction 1600 is performed only once, human intervention at this initial stage in not onerous. The bounding box 1210, may for example, be 100 pixels by 500 pixels. However, any suitably sized bounding box may be established depending on the footprint training data 1610. All information within the bounding box 1210 may be considered to be "positive" training data, and everything outside of the bounding box may be considered to be "negative" training data. Next, further sub-regions or small rectangles of data within the positive training data may be sampled randomly. Processing is the same as or is similar to positive and negative feature extraction image conversion 1430 of FIG. 14.

Footprint Classification Engine 1640 processes the data from the sub-regions or small rectangles of data within the positive training data area described above. The footprint classification engine 1640 learns the difference or the distinction between positive training data and negative training data using a machine learning technique (e.g., a Cascade Classifier or Neural Network, described below). Machine learning techniques establish a model with some unknown parameters. The model provides a general framework for the solution, and the machine learning algorithm searches for values for the unknown parameters that produce the best performance.

This search procedure is an optimization routine, using so-called Boosting (for Cascades) or back-propagation (for Neural Networks). In the case of Cascades, for example, sub-regions or small rectangles of data are considered and the footprint classification engine determines a score corresponding to how likely or what the probability is that the data within that sub-region is, in fact, part of a footprint, as opposed to not being part of a footprint. Sub-regions are ranked, and their scores selectively combined to yield the best performance on the training data. The output of the footprint classification engine 1640 is a set of parameters (learned footprint detection parameters 1642) which exhibited the best performance (i.e., correct discrimination of positive and negative training images), which will hopefully yield the best performance for on-line data.

Often, learned parameters will not have a human-interpretable meaning. Indeed, the only meaning for the parameters is that they resulted in the best performance. This is often the case for Neural Networks where the parameters are merely matrices indicating weightings and different levels of the hierarchy. In the case of Cascade Classifiers, the learned parameters are sub-regions of the image and importance weightings. We generally expect that intuitively relevant parts of the image will receive higher weightings, but human intuition is not always consistent with the cascade's learned parameters. For example, we might expect that the right angles of the pins in a symbol might be important for classification; we expect to see a few important sub-regions which highlight such right angles. As an analogy, consider Cascade Classifiers for face detection in portable cameras. The sub-regions of these algorithms often include the eyes and mouth, prominent indicators of a face.

Pad Classification Engine 1650 learns parameters to discriminate a footprint's pads or holes. A pad is required location of a conductor (e.g., copper) on the PCB to accommodate the chip during soldering; a hole is the required location of conductors and drill holes to accommodate a through-hole part. Example pads are shown at 522. Pads are often circles, squares, rectangles, or simple polygons. Using training data 1610 which contains examples of pads, 1650 uses machine learning techniques (e.g., Cascades or Neural Networks) to optimize a set of parameters to distinguish pads from other shapes in the datasheet. The output of the pad classification engine 1650 is a set of parameters (learned pad detection parameters 1652) which exhibited the best performance (i.e., correct discrimination of positive and negative training images), which will hopefully yield the best performance for on-line data.

Dimension-line-Arrow Classification Engine 1660 performs processing to learn a set of parameters to discriminate dimension lines. Example dimension lines are shown in the bottom half of FIG. 4 (e.g., the arrowed lines labeled "A", "A1", "A2", etc.). These dimension lines allow the arbitrary scale of the datasheet's pixels to be converted into metric, physical units (e.g., millimeters or inches). For example, in FIG. 4, dimension "b" places a minimum on the pad width of 0.19 mm (value obtained from the table in top of FIG. 4). Using training data 1610, which contains examples of dimension lines, the dimension-line-arrow classification engine 1660 uses machine learning techniques (e.g., Cascades or Neural Networks) to optimize a set of parameters to distinguish dimension lines from other lines in the datasheet. The output of the dimension-line-arrow classification engine 1660 is a set of parameters (learned dimension line/arrow detection parameters 1662) which exhibited the best performance (i.e., correct discrimination of positive and negative training images), which will preferably yield the best performance for on-line data.

Note that the learned footprint detection parameters 1642, the learned pad detection parameters 1652, and the learned dimension line/arrow detection parameters 1662 are preferably saved in computer memory, or in a local storage, or in a remote database, and may be saved in any suitable data file format that can represent collections of matrices and other data.

VI. Footprint: On-Line Processing for Footprint Extraction—Detail

On-line processing for footprint extraction 1700 is significantly more complex than on-line processing for symbol extraction 1500 because technical drafting conventions allow the same information to be conveyed in many ways. For example, pins may be visually omitted for clarity from the PDF sheets that comprise the footprint design input data 1710, relying on the user's intuition and/or understanding of the design process and the datasheets as well. Further, physical dimensions can be encoded on the dimension-lines or referenced in tables. As a result, additional processing is employed for dimension-lines and, as before, the user may provide manual input at various stages if needed.

Figure 17:
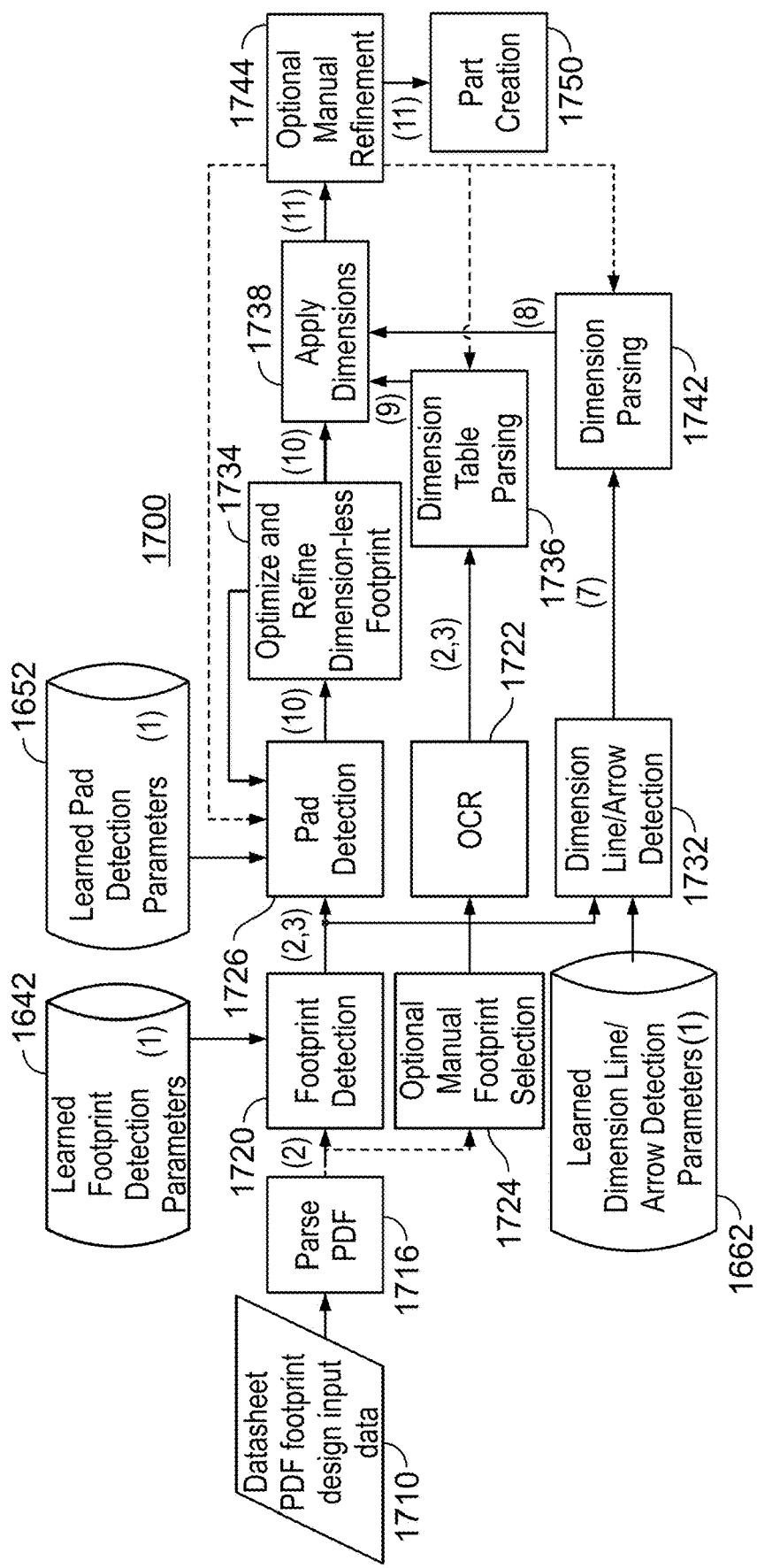
FIG. 17 is a flowchart illustrating on-line processing for footprint extraction, which flow begins with a datasheet in PDF format and creates a part which can be loaded directly into Cadence, Altium, Eagle, Mentor Graphics, or other commercially available EDA products. Optional manual steps are shown in dashed lines, according to one embodiment.

On-line processing for footprint extraction 1700, as shown in FIG. 17, begins with a datasheet in PDF format (footprint design input data 1710) selected and provided by the designer, and creates a part which can be loaded directly into Cadence, Altium, Eagle, Mentor Graphics, or other commercially available EDA product.

Processing includes parse PDF 1716, footprint detection processing 1720, optional manual footprint selection processing 1724, pad detection processing 1726, optical character recognition processing 1728, dimension line-arrow detection processing 1732, optimize and refine dimensionless footprint processing 1734, dimension table processing 1736, apply dimension processing 1738, dimension parsing processing 1742, optional manual refinement processing 1744, and part creation 1750.

The user interacts with the system during the on-line processing for footprint extraction via a web front-end similar to FIG. 5. Certain modules, such as, Parse PDF, Footprint Detection, Manual Footprint Selection, OCR, and Part Creation shown in FIG. 17 proceed analogously to their flow chart counterparts shown in FIG. 15 of on-line processing for symbol extraction. The remaining modules of on-line processing of FIG. 17 include:

Parse PDF 1716 parses the PDF document 1710 (the footprint design input data) and flattens the graphical elements. This produces an in-memory representation of what the user would see on the screen. Similar to the processing for PDF to image conversion 1622, this process also "flattens" the PDF document, which is inherently a layered vector document. Similarly, parse PDF 1710 does not reduce text to image data, as it is preferable to isolate that text as "plain text" and not as an image.

Footprint Detection processing 1720 uses the learned parameters (learned footprint detection parameters) 1642 to process each page in the PDF datasheet, also referred to as the datasheet PDF footprint design input data 1710. Footprint detection processing 1720 selects the most likely locations of the footprint in the PDF datasheet. Recall that a particular PDF datasheet of interest to the PCB designer may be several pages to tens of pages in length, and footprint detection processing 1720 attempts to automatically locate and identify where the footprint(s) are located among the multiple PDF pages, based on the learning that was performed only one time during off-line processing for footprint detection 1600. For example, in FIG. 5, footprint detection 1720 would place a bounding box 522 around the top-down view of the chip.

Manual Footprint Selection processing 1724 is an optional step in some embodiments that may be performed if the results of footprint detection processing 1720 are not satisfactory. The user can bypass or augment footprint detection processing 1720 or correct errors by manually selecting a bounding box via the web interface 510. This bounding box selects the page and region of interest for further processing. In that regard, the user may physically draw the bounding box on the screen to identify the actual footprint for further processing. Once the user has performed this optional processing 1724, on-line processing continues to the next step.

Pad Detection processing 1726 considers regions within the bounding box provided by Footprint Detection 1720 and detects the location of the component pads and makes use of the learned pad detection parameters 1632 generated during on-line training for footprint extraction 1600. The potential locations of pads on the PDF datasheet (footprint design input data 1710) are determined via the learned pad detection parameters 1652. For example, in the bottom pane of FIG. 4, the rectangles associated with the pins are repeated 20 times, once for each pin. This processing 1726 outputs a list of bounding boxes around potential pads, including potentially erroneous results. These pad bounding boxes will be further refined in optimization 1734 by statistically bounding boxes for repetitive and aligned shapes, as most parts have multiple pins with the same physical dimensions aligned along similar directions. For example, in the bottom page of FIG. 4, all the pins are the same size and located in two horizontal rows.

Optical Character Recognition processing 1722 is performed. In that regard, some PDF documents may store text as image data rather than actual textual data, and in such instances, optical character recognition (OCR) may be performed to convert such text images back into understandable or computer readable text. This specific OCR processing 1722 is unique in that it must recognize text at various orientations because the datasheet text is often rotated, and the text is rarely in the form of complete sentences (i.e., sentence context may not available here, but is often used to assist in OCR). Thus, OCR processing 1722 is able to convert pin numbers and pin names into actual text where such pin numbers and pin names are in the form of image data and may be received in any orientation. OCR 1722 is especially necessary during footprint extraction. Although some tables (e.g., FIG. 4, top pane) may be stored as text, many of the physical drawings (FIG. 4., bottom pane) are imported from CAD programs. In these cases, the data is neither text (as character strings) or images of text; rather, it is a collection of small lines. That is, the letter "X" might be constructed of two crossing lines (rather than the letter "X" or an image of the letter X). As a result, 1722 proceeds by rendering the PDF to an image and extracting all text via OCR.

Dimension-line/Arrow Detection processing 1732 determines the various lines and dimensions associated with the lines. Dimension-lines are used in technical drawings to specify distances. This processing 1732 identifies the extension/dimension-lines and associated text and makes use of the learned dimension line-arrow detection parameters 1662 generated during on-line training for footprint extraction 1600. The result of dimension-line/arrow detection 1732 is a collection of bounding boxes around dimension lines, including the leader lines, arrow heads, and text. The included text is often the dimension itself (e.g., "12 mm") or a reference to a table (e.g., "A").

Optimize and Refine Dimension-less Footprint processing 1734 optimizes and refines the footprint. Several sources of noise exist during pad detection (e.g., bad detections, pads eliminated for clarity, etc.). This optimization process 1734 fits a model with the correct number of pins (possibly known from the symbol extraction) to the pad detections. This process probabilistically searches for pad position and orientation, while filling in missing pads. For example, models might be created and iteratively compared and improved by comparing against the pad detections. In some embodiments, a model might include the number of pins on each side of the chip, and a uniform, nominal pad dimension. Expected pad locations would be generated from the model and compared to the observed pad locations from pad detection processing 1726. The differences during comparison can be used to adjust the model and the process repeats until no errors exist. This works well for uniform pad arrangements (typical in chips). However, some connectors components have asymmetric locations or irregular pad shapes. Highly likely pads, even if irregular and/or asymmetric, may be allowed and refined in via manual intervention in optional manual refinement processing 1744.

Dimension Table Parsing processing 1736 handles table parsing. Some footprints use letters in the dimension text which reference a table, often with tolerance information, as shown in FIG. 4. This parsing process 1736 converts from the dimension reference to a number. Tables often contain several columns, such as the minimum/maximum tolerance and the typical value. Columns may also exist for Metric and Imperial units. Many tables are sufficiently regular that the row of a dimension, e.g., "E1", can be recovered by simply reading the text along the row's line and recording the columns' header name. For example, processing might search for the column with "mm" and "Typ" to extract the typical value in millimeters. The interpretation of a table (value of each row/column) might also be learned via, e.g., a neural network, in some embodiments.

Apply Dimensions processing 1738 receives input in the form of a complete footprint, but without any physical dimensions. The dimensions extracted previously provide noisy constraints about the physical dimensions, and this module solves a constraint satisfaction problem (CSP). In doing so, apply dimension processing 1738 attempts to resolve redundant and possibly conflicting information about the physical size of the pads. These constraints establish relationships between pixels and, e.g., meters. The scale of the diagram is often consistent (e.g., the location of a pixel can be multiplied by a scale factor to produce a physical unit), but errors in footprint extraction processing 1700 and graphical errors/approximations in the PDF may, in certain circumstances, cause discrepancies (for example 5 mm might be 6 pixels or 7 pixels due to errors in the drawing). Apply dimension processing 1738 finds a mapping from pixels to meters (or inches) by selecting a mapping which satisfies the most constraints. This is a CSP problem and involves searching in constraint space.

Dimension Parsing processing 1742 extracts text within the dimension bounding box. Often all the text within the bounding box is the "value" of the dimension. This value may be a number (e.g., "10") or a number with units (e.g., "10 mm") or a number with tolerances (e.g., "10±1") or some combination. The value may also be a reference to a lookup table, e.g., "E1". Dimension processing 1742 may often select the string nearest the center of the dimension, but machine learning may also be used to extract the dimension value. For example, some dimensions place the value at the end of a leader line. Errors and misclassifications within dimension parsing processing 1742 must be handled by the next level of processing, namely, apply dimensions processing 1738.

Manual Refinement processing 1744 allows the user to provide further input or correct errors in pad detection processing 1726, dimension table parsing 1736, and dimension parsing 1742. When insufficient dimensional constraints can be extracted (under-constrained) or there are too many constraints (over-constrained), the user may provide, or may be asked to provide, clarifications about constraints (add/remove/correct constraints) in dimension parsing 1742. If dimensions are incorrectly extracted from a lookup table, the user may provide, or may be asked to provide, corrections to dimension table parsing 1736. If pads are neglected or an incorrect region is identified as a pad, the user may provide, or be asked to provide, corrections to pad detection processing 1726. Once the corrections are provided, the subsequent processing is re-executed.

Part Creation processing 1750 is the final stage in on-line processing for footprint extraction 1700. The footprint representing the part is extracted from an internal format from storage to generate an output file, which output file is compatible with and can be loaded by a plurality of popular commercially available EDA software packages.

Note that before the output of the system 100 is usable, both symbol processing 1400, 1500 and footprint processing 1600, 1700 must be complete. In that regard, as described above with respect to FIG. 1, the order of completion for symbol processing 1400, 1500 and footprint processing 1600, 1700 is immaterial as long as both processes have finished, with both off-line training processes 1400, 1600 being completed before either of the on-line process 1500, 1700 are begun. Upon completion of symbol processing 1400, 1500 and footprint processing 1600, 1700, the part creation processing will merge the symbol data with the footprint data and link the pin names with the pin numbers. The final output may then be converted, if needed, into the specific format required by the EDA software package. Such output then represents a completed part ready to use in the commercially-available software package by the designer.

VII. Related Processes

Web Interface

Figure 6:
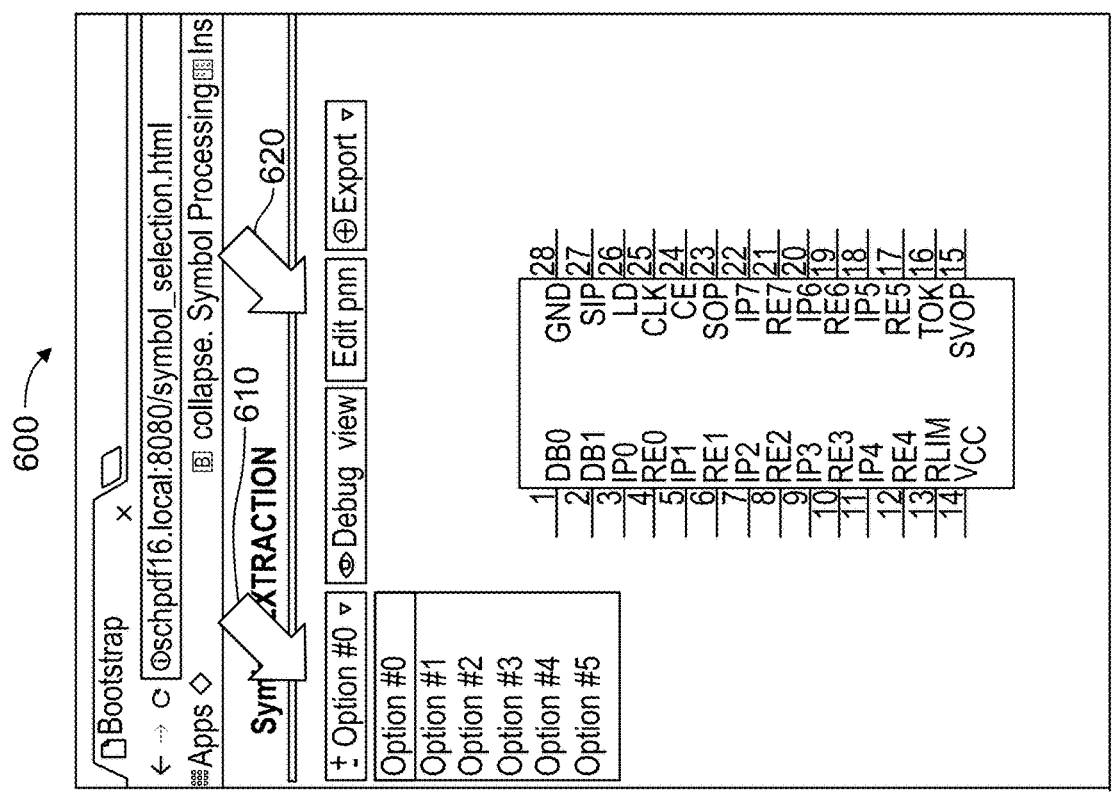
FIG. 6 is an illustration of symbol extraction, which allows the user to choose different ranking solutions.
Figure 7:
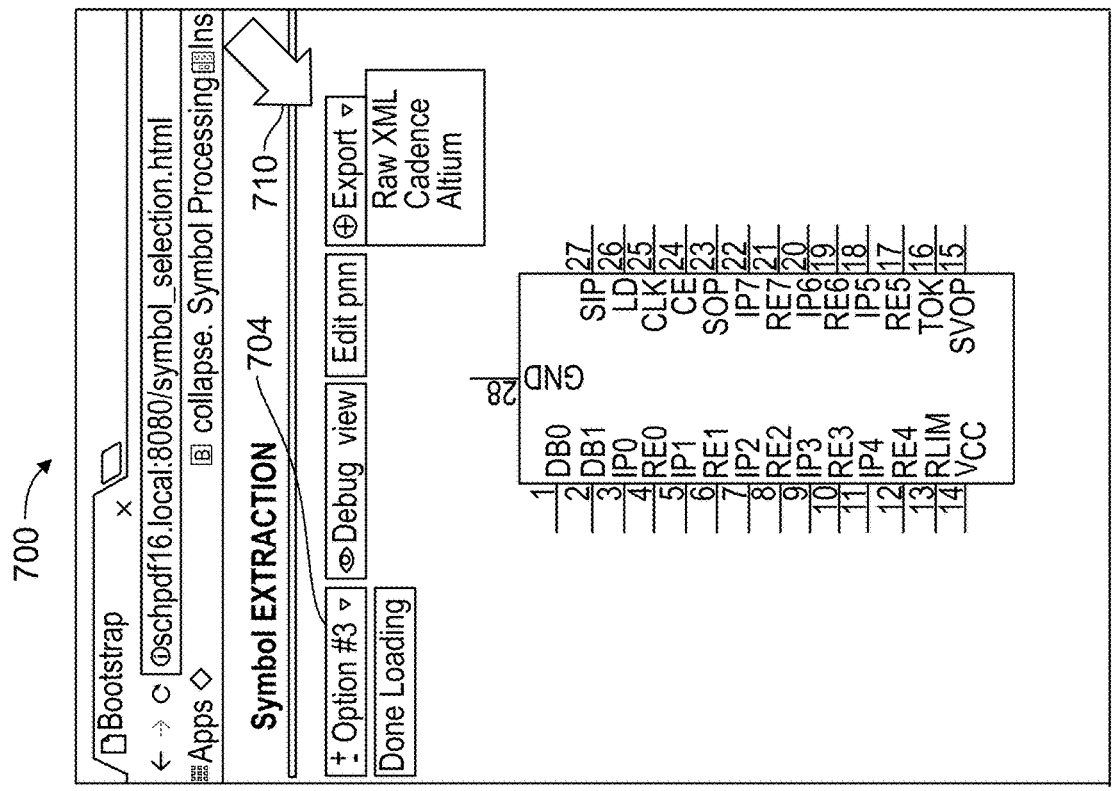
FIG. 7 illustrates symbol extraction, which allows the user to export data files in different formats, according to one embodiment.
Figure 8:
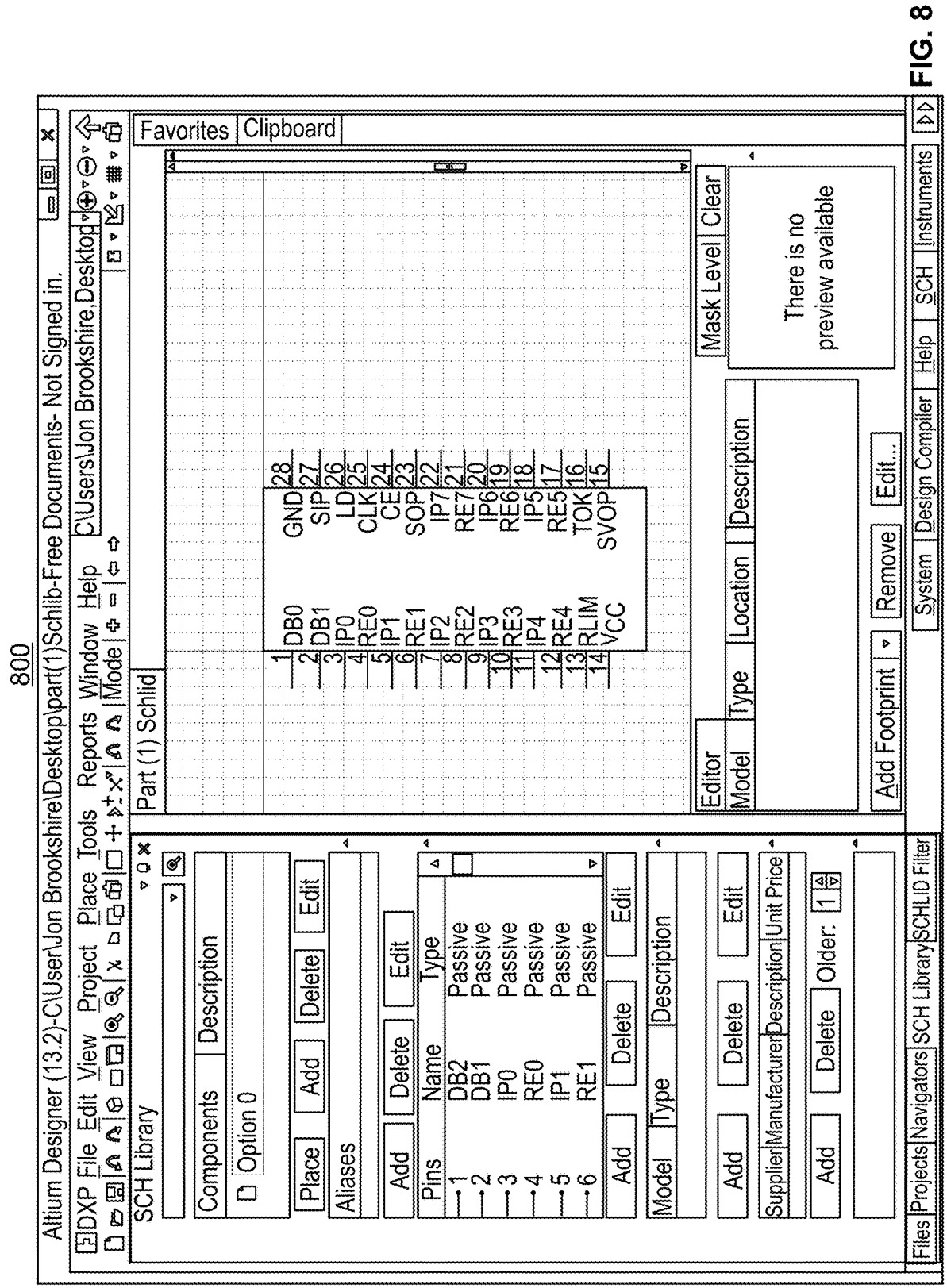
FIG. 8 is a screen shot, which illustrates that the extracted symbol can be opened in commercially available design tools, such as Altium Designer, according to one embodiment.

The web interface 510 according to one embodiment is described with reference to FIGS. 5-8. A GUI (graphical user interface) or web browser client interface may be used as a convenient method for input and change to facilitate on-line processing for symbol extraction 1500. FIG. 5 shows a symbol selection web interface 510, and FIG. 6 shows a screen shot 600 of extraction of a symbol, which allows the user to choose different ranking solutions. FIG. 7 shows symbol extraction 700 that allows the user to export in different formats, and FIG. 8 shows the extracted symbol 800 that may be opened in, for example, Altium Designer. In some embodiments, the user may perform the following steps via the web interface:

A. The user enters the URL of the PDF datasheet to be used in the PCB design (FIG. 5, see arrow 526). The server then downloads and parses the PDF or symbol design input data 1510.

B. The user can optionally pan, zoom, and page through the PDF or symbol design input data 1510 (FIG. 5, see arrows 528, 530). When the symbol is found, the user may click on "Select" (FIG. 5, see arrow 532), manually draw the PDF bounding box (e.g., 522), and then instruct the system to "Extract" the symbol (FIG. 5, see arrow 536), which invokes on-line processing for symbol extraction 1500. The user may also select "Extract" and allow the system to find the symbol among the pages of the datasheet.

C. The user is redirected when the extraction is complete. The best ranking option is shown in FIG. 6. The user may view other ranking options 610. In FIG. 7, a second ranking option 704 is shown, where the GND pin has been moved to the top side.

D. The user may edit pin names, pin numbers and placements (FIG. 6, see arrow 620).

E. The user may export the symbol to one of several supported packages (FIG. 7, see arrow 710).

F. The user can then open the part as shown in the screenshot 800 of FIG. 8 in one of the supported packages.

Misclassified Text

Figure 9:
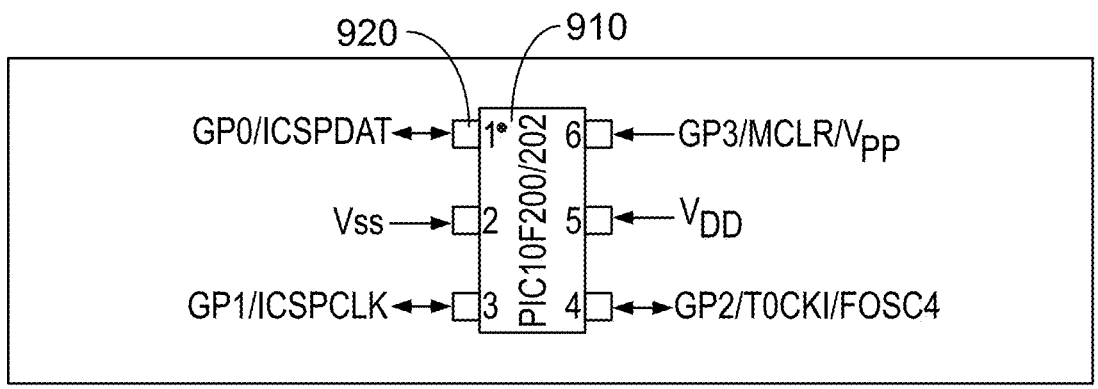
FIG. 9 shows a symbol of an 8-bit microcontroller integrated circuit from a manufacturer's PDF datasheet, according to one embodiment.
Figure 10:
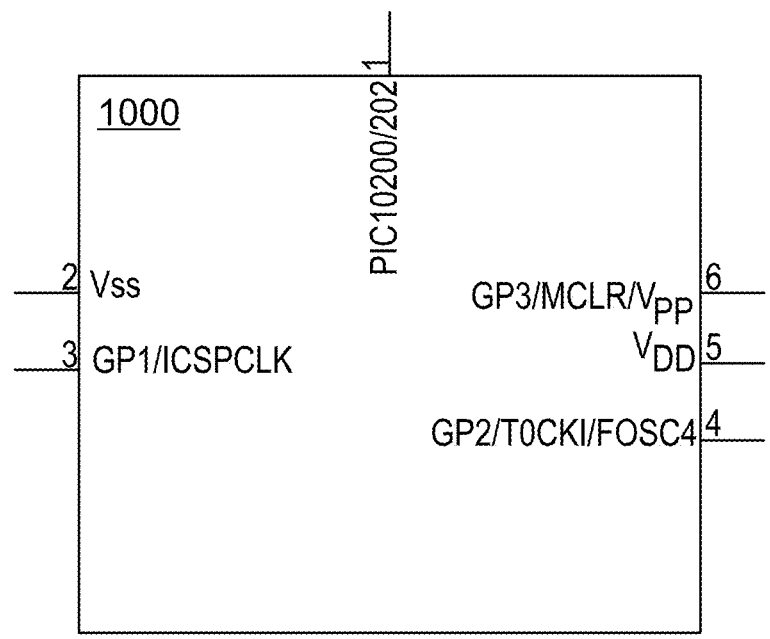
FIG. 10 illustrates a second highest ranking recovery that demonstrates confusion or ambiguity, in particular because pin 1 is associated at the top with the part label.
Figure 11:
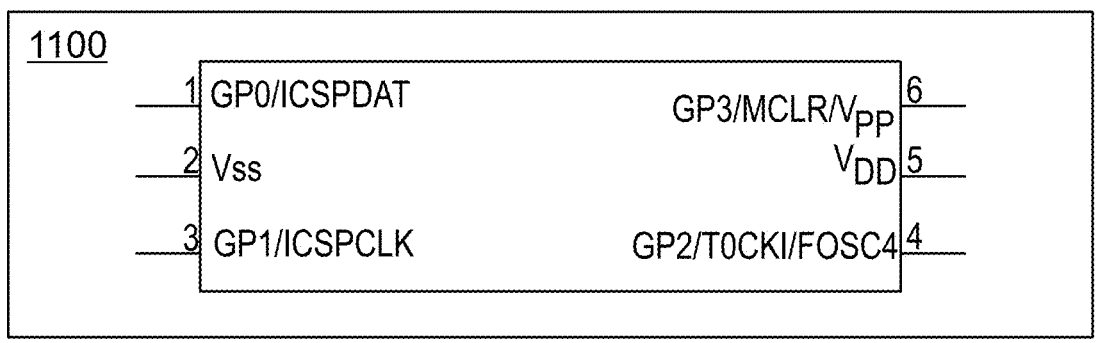
FIG. 11 illustrates that the highest ranking recovery is correct.

Referring now to FIGS. 9-11, misclassified text is discussed. FIG. 9 shows a symbol from PDF datasheet 900 while FIG. 10 shows a second highest ranking recovery 1000 that demonstrates confusion or ambiguity in the output results. Note how pin 1, in this specific example, is incorrectly associated at the top with the part label. FIG. 11 shows that the highest-ranking recovery is correct 1100. With respect to misclassified text, non-relevant text in the PDF symbol can be confused with pin names and numbers. This motivates the optimize and refine pin name-pin number association processing 1554 to obtain improved results. In this example, a part label in the PDF may be confused with a pin name. The confusion may arise because the part label is actually closer to the pin numbers than to the pin name. As shown in FIG. 9, the part label "PIC10F2002/202" (910) is physically closer to the pin number "1" (920) than is the true pin name "GP0/ICSPDAT."

Data Products or Outputs

The algorithms or processing steps shown in FIGS. 14-17 produce a number of intermediate data products or outputs. In FIGS. 14-17, certain boxes (modules or processes) have an associated superscript or digit in parenthesis. These superscripts or digits represent input and/or output (storage and data) associated with that process or module, as described below:

(1) Learned Parameters. These parameters are the output of the off-line learning, including learned symbol detection parameters 1442, learned pin name-pin number detection parameters 1452, learned grouping parameters 1462, learned footprint detection parameters 1642, learned pad detection parameters 1652, and learned dimension line-arrow detection parameters 1662. They can have one or more of the following elements:

a. Deep neural network parameters: Neural Networks express a nested, layered set of functions. During learning, the parameters of these functions are optimized to best model the training data. For example, the output $x_i$ of the i-th layer can be expressed as $x_i = f(W_i x_{i-1} + b_i)$. If the (i−1)-th layer has N nodes and the i-th layer has M nodes, then $W_i$ will be a matrix of size M×N and $b_i$ will be a vector of size N×1. Thus, the intermediate data products can be considered a series of matrices, vectors, and activation functions, ƒ, expressed in tables and databases.

b. Cascades/trees of classifiers: Cascades and trees of classifiers group a series of classifiers together (e.g., sequentially or in a nested tree). These classifiers are often used for image classification (e.g., for the "Learned Symbol Detection Parameters"). The intermediate data product would be a set of rectangular regions in the image (i.e., "a box of pixels") and a set of threshold parameters expressed as object lists.

Figure 12:
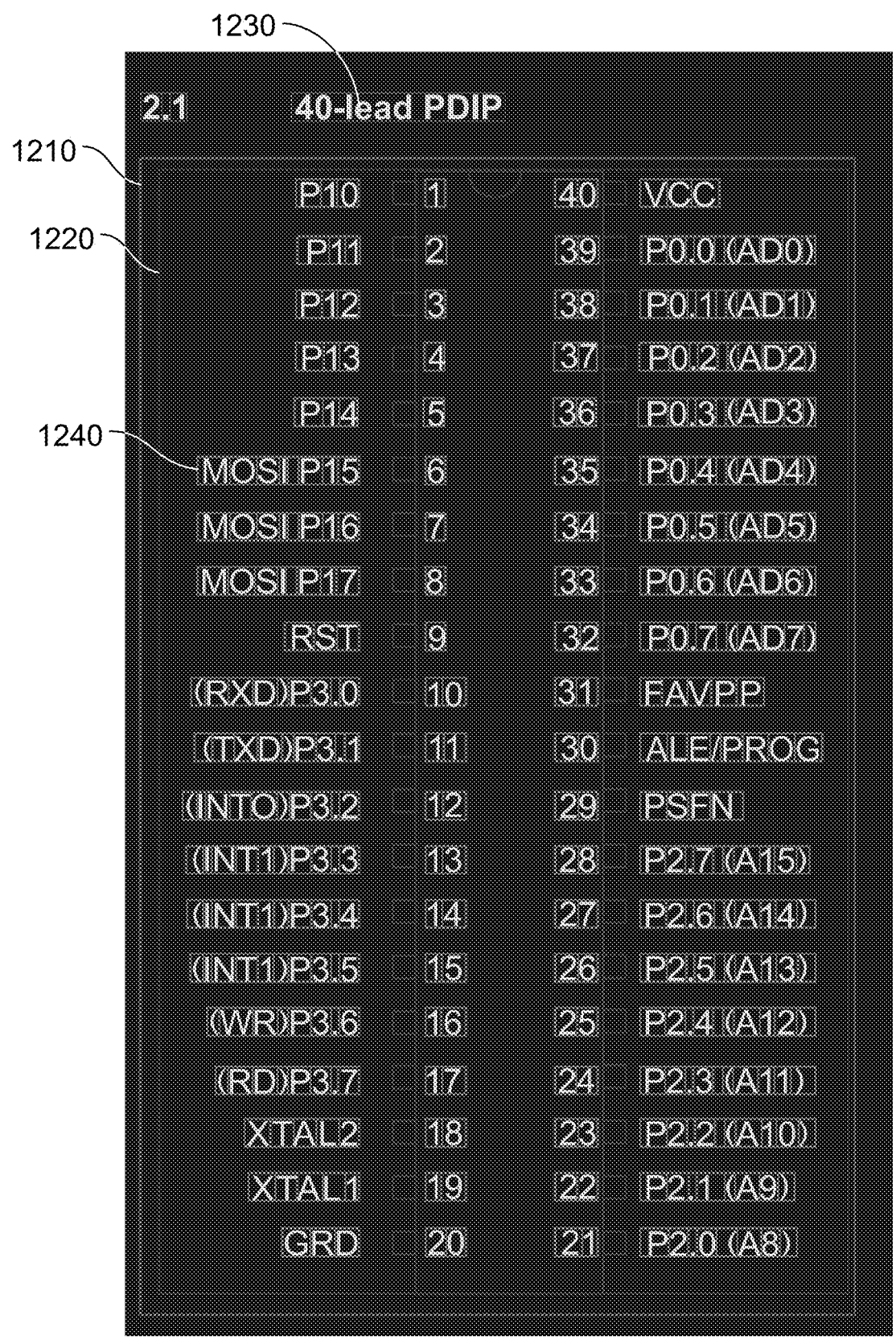
FIG. 12 shows examples of a symbol selection bounding box and PDF line extractions, including PDF text extractions and their associated bounding boxes, according to one embodiment.

(2) Parsed PDF. The Parsed PDF is a list (or table) of primitive graphic entities consisting of lines (FIG. 12, blue, 1220) and text characters (FIG. 12, yellow, 1230). For example, the list would contain a series of the start and stop pixel locations of every line on a page of the PDF. PDF's can contain collections of lines (e.g., rectangles), complex curves, and words; however, not every PDF will encode objects in the same way. For example, a rectangle can be stored as a rectangle or as four lines. To handle any representation, we decompose all complex shapes to lines or single text characters and rebuild more complex shapes as necessary. FIG. 12 shows examples of a symbol selection bounding box 1210 shown in red and PDF line extractions 1220 shown in blue. PDF text extractions 1230 shown in yellow and their associated bounding boxes 1240 are shown in green.

(3) Bounding Box. A bounding box 1210 is a rectangle expressed in pixel coordinates. It is used to store axis-aligned regions of interest (e.g., the location of the symbol on the PDF page in FIG. 12, red). For example, a bounding box might be specified as "(x,y,w,h)" where "x" and "y" are the corner point and "w" and "h" describe the width and height, respectively, of the box.

(4) Lists of Pin Names and Pin Numbers. This product is a list of pin names or pin numbers, their associated bounding boxes on the PDF page, and their orientation in the PDF (left, right, top, bottom). This list is stored as a database in memory.

(5) List of Pin Name-Number Maps. A Pin Name-Number Map is a one-to-one association between each pin name and its corresponding pin number. This mapping may also include bounding boxes. This data product is a list of these maps. Essentially each map represents one possible interpretation of the symbol. The user is presented with many such interpretations ranked according to likelihood; the operator has the opportunity to choose the best interpretation. This information may be stored as an XML text file, but other suitable formats may be used. For example, the following is a map for the symbol in FIG. 11: {"1"=>"GP0/ICSPDAT", "2"=>"VSS", "3"=>"GP1/ICSPCLK", "4"=>"GP2/T0CKI/FOSC", "5"=>"VDD", "6"=>"GP3/MCLR/VPP"}. This map indicates how pins 1-6 are assigned to their corresponding pin names.

(6) Pin Name Ordering. A sorted list of pin names per each orientation which is used to determine how the symbol pins are drawn on the final part. This information may be stored as part of an XML text file, but other suitable formats may be used. For example, for the symbol in FIG. 11: {"left_side"=>{1,2,3}, "right_side"=>{6,5,4}}. The first list "left_side" contains pins in the top-to-bottom order {1,2,3}; the second list "right_side" contains pins in the top-to-bottom order {6,5,4}. This data may also contain symbol annotations, such as the part name or other data convenient to display to the user.

(7) Lists of Dimension-lines. A list of bounding boxes specifying the pixel location of dimension-lines and arrows. This information may be stored as table in memory. For example, "[(11,12,100,200), (13,14,300,400)]" might describe two bounding boxes. The first has a corner at (11,12) and a width/height of (100,200). The second has a corner at (13,14) and a width/height of (300,400).

(8) List of Dimension Constraints. A list of constraints in the image, expressing relationships between pixels and physical units or dimension table references. For example, the list might specify that the distance between "pixel X and pixel Y must be Z meters". These constraints are considered "soft" constraints which may be incorrect and/or may conflict (e.g., two constraints may specify different distances between the same pixels). This information is stored as table in memory. Using FIG. 4, for example, a partial list might be "{"D"=>(100,100,200,100), "E1"=>(300,500,300,575)}". Such a list would indicate that dimension "D" represents a distance from point (100,100) to (200,100) and dimension "E1" represents a distance from (300,500) to (300,575).

(9) Dimension Table Map. A mapping between variables and physical units. Some PDF's use tables converting letters (e.g., "A", "B", "b") to physical units (e.g., "15 mm"). This mapping provides a way to convert variables into physical units. This information is stored as a database in memory. Using FIG. 4, for example, a partial list might be "{"D"=>9.7, "E1"=>"4.4"}" indicating that dimension "D" corresponds to 9.7 mm and "E1" to 4.4 mm.

(10) List of Pad Bounding Boxes. A list of pad bounding boxes in pixel coordinates. The list may contain overlapping or "bad" locations, to be refined at later stages. This information is stored as a database in memory.

(11) List of Lists of Pad Physical Locations. Each footprint is described by a list of pad locations and dimensions which are expressed in physical units. This data product is a list of such footprint descriptions (i.e., a list of lists). Each description represents one possible interpretation of the footprint ranked by likelihood, allowing the user to optionally choose the best. This information may be stored as an XML file, but other suitable formats may be used. For example, a footprint with two identical pads might be described as "{"1"=>(0,0,10,20), "2"=>(30,0,10,20)}". The pad associated with pin "1" is centered at (0,0) with size (10,20). The pad associated with pin "2" is centered at (30,0) also with size (10,20). This list may also contain footprint annotations, such as hole sizes, the package name, or other data convenient to display to the user. From the pad locations, other data such as silk screen and routing clearances can be derived.

Cascade Classifiers

A classifier is a combination of an algorithm and learned parameters that provide a score indicating how likely a portion of the image is to contain a symbol (or footprint, text, etc.). Processing using such classifiers is shown, for example, in FIG. 16 with respect to the footprint classification engine 1640, the pad classification engine 1650, and the dimension-line/arrow classification engine 1660. Classifiers generally operate on small, fixed-size "sub-windows" of the image. For example, a classifier according to one embodiment might classify a 64×64 pixel image, returning a score ranging from 0 to 1. A score of 1 indicates the sub-window contains a symbol, a score of 0 means it does not contain a symbol, and 0.5 would mean it cannot determine if the sub window contains a symbol.

There are a variety of different algorithms for a classifier or classification engine that may be used in processing 100. On one embodiment a support vector machine (SVM) may be used, but any weak learner whose classification ability is greater than chance can be used (e.g., a decision stump). An SVM uses its learned parameters to define a decision boundary. The distance from that decision boundary determines the score (sub-windows near the decision boundary receive a lower, less confident score; sub-windows further from the decision boundary receive higher, more confident scores).

A single SVM classifier is often not powerful enough to classify sub-windows alone (it is often called a "weak" classifier). These weak classifiers can be chained together to form a "cascade classifier." In a Cascade Classifier, the sub-window is passed through a series of weak classifiers. Each weak classifier returns a score of either "high confidence" or "unknown." Unknown sub-windows are then passed to the next weak classifier. In this way, early stage classifiers resolve the "easy" sub-windows, and later stage classifiers resolve the "hard" sub-windows. Because classifiers work on fixed-sized windows at fixed scale, they must be scanned over the image at different positions and scales. The processing described herein may use a cascade of weak classifiers, with tens of stages and ten to hundreds of weak learners per stage.

Neural Networks

Figure 13:
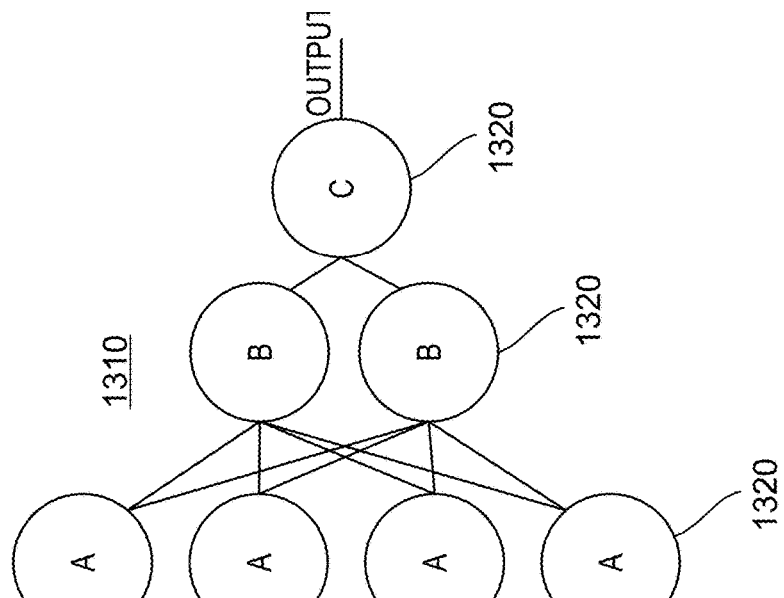
FIG. 13 illustrates a sample Neural Network structure, according to one embodiment.

FIG. 13 show an example of a neural network structure 1310. A neural network consists of a set of connected "neurons" 1320. Each neuron computes a function of its inputs and outputs a single value. This function is often a linear transformation, followed by a non-linear activation function. The parameters of the linear transformation (i.e., scale and offset) are the "learned parameters." As shown in FIG. 13, regions of the image feed neurons (A, B, C) to produce a classification output. Such processing using Neural Networks is shown, for example, in FIG. 14 with respect to the learned symbol detection parameters 1442, learned pin name/number detection parameters 1452, and learned grouping parameters 1462, and is also shown in FIG. 16 with respect to the learned footprint detection parameters 1642, learned pad detection parameters 1652, and learned dimension-line-arrow detection parameters 1662.

The input to the neural network might be text (e.g., for pin name identification) or pixel values (e.g., for symbol or footprint classification). Neurons are often arranged in layers, where the output from one layer feeds the input to the next layer of neurons. The parameters of the network are then determined by providing example inputs and outputs and optimizing the network until it performs as desired.

When classifying images and pin name/number text, important features can exist anywhere in the data. For example, a symbol may appear in the upper left or lower right corner of the PDF page. It is desired that the network treat each location similarly. As a result, convolutional and pooling techniques are used to provide some positional-independence. Convolution layers use the same neurons at different locations, and pooling techniques reduce the number of parameters (often to simplify training).

In the symbol classification task, the "input" would be a positive or negative example of a symbol and the output would be a "1" or "0" symbol or not symbol classification.

EDA Systems Generally

Known PCB layout design software, and in particular, known EDA software tools are very inefficient, and require a large user time-commitment to manually enter the numerous components to be included in the PCB design, which numerous components are often not found in the library of the EDA software tool. Such EDA software tool libraries are woefully incomplete and outdated.

Different EDA systems provide partial libraries of different components, where some libraries of different EDA tools may overlap, but in each case, such libraries of known EDA software tools are vastly incomplete and merely provide some of the most common components. Also, new components are produced and disseminated frequently, however EDA libraries may be infrequently updated, or not at all. This is a technical problem associated with EDA related computer software and dedicated EDA computer systems because unknown components cannot be processed by the EDA systems, and merely providing a datasheet for the unknown component does not permit the EDA system to utilize the component in a PCB design. A human operator must manually provide the input for the component into the library in such systems.

Further, the datasheets published by the manufacturers are intended to be "consumed" by humans reading the document, and are not produced in anticipation of machines processing of such documents. Accordingly, such datasheets are idiosyncratic and often rely on human intuition and convention to digest, and are not produced in machine-readable format. This make it very difficult for computers to process these documents as there are no fixed conventions or rules for processing such component datasheets using machines.

Embodiments of the present invention solve the above-described technical problems associated with the computer systems used in PCB design tools because unknown or "new" components, including newly developed and newly disseminated components can be processed by the EDA software tool on-line without human intervention to manually add a new component to the library. This is possible because the deep learning process or training performed during off-line symbol processing and during off-line footprint processing (e.g., the training process) provides the identified symbol characteristics and the identified footprint characteristics needed to recognize and process a component during the on-line processing.

Figure 18:
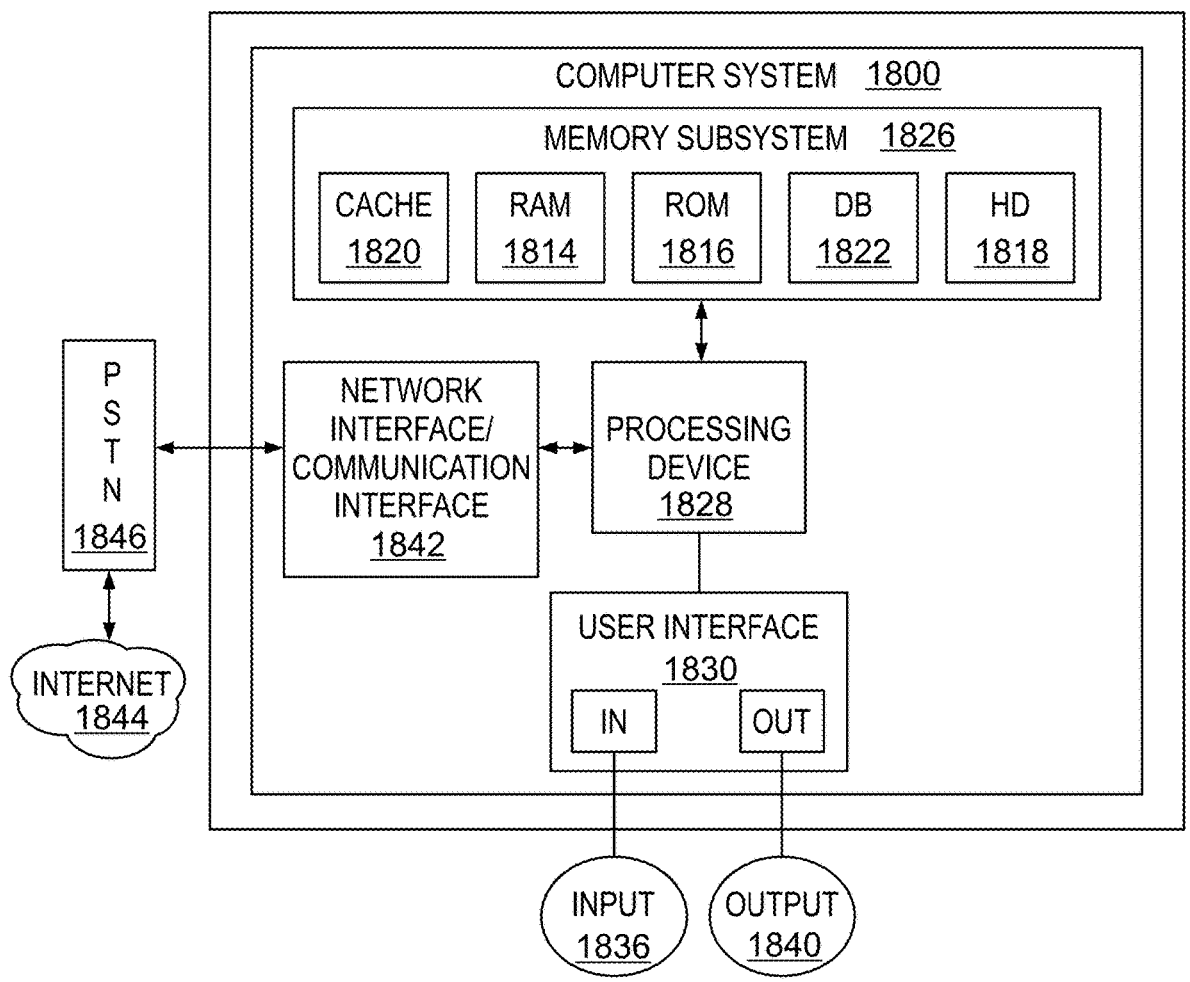
FIG. 18 shows a representative computing platform and operating environment for a system for electronic automated printed circuit board design.

As shown in FIG. 18, the system and method for electronic automated printed circuit board design may be embodied as a system cooperating with computer hardware components and/or as computer-implemented methods. The system may include a plurality of software modules or subsystems. The modules or subsystems, such as the off-line learning process of FIG. 14, the on-line processing portion shown in FIG. 15, the footprint extraction processing portion shown in FIG. 16, and the on-line processing portion shown in FIG. 17, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network. The system may be embodied as a system cooperating with computer hardware components and/or as computer-implemented methods. The system may include a plurality of software modules or subsystems.

FIG. 18 is a high-level hardware block diagram of a system computer 1800 that may be used to execute software or logic to implement the system and method 100. The computer 1800 may be a personal computer, work station, remote computer, server, and the like, and may include various hardware components, such as RAM 1814, ROM 1816, hard disk storage 1818, cache memory 1820, database storage 1822, and the like (also referred to as "memory subsystem 1826"). The computer 1800 may include any suitable processing device 1828, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 1828 may be an Intel Pentium® microprocessor, x86 compatible microprocessor, or equivalent device, and may be incorporated into a server, a personal computer, or any suitable computing platform.

The system also relies on co-processing/graphic devices such as Graphical Processing Units (GPU's). GPU's allow the off-line learning to be heavily parallelized and make the process efficiently usable. GPU's may include, e.g., those that employ the NVIDIA CUDA architecture. The computer 1800 may include one or more GPU's, which may be part of or integrated into the computer or processor, or may be separate commercially-available components, chips, or entire boards.

The memory subsystem 1826 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 1830 may be coupled to the computer 1800 and may include various input devices 1836, such as switches selectable by the system manager and/or a keyboard. The user interface also may include suitable output devices 1840, such as an LCD display, a CRT, various LED indicators, a printer, and/or a speech output device, as is known in the art.

To facilitate communication between the computer 1800 and external sources, a communication interface 1842 may be operatively coupled to the computer system. The communication interface 1842 may be, for example, a local area network, such as an Ethernet network, intranet, Internet, or other suitable network 1844. The communication interface 1842 may also be connected to a public switched telephone network (PSTN) 1846 or POTS (plain old telephone system), which may facilitate communication via the Internet 1844. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for generating an electronic component symbol and a corresponding component footprint for use in a printed circuit board design tool, the method comprising:
   a) providing a plurality of training datasheets corresponding to a plurality of components;
   b) learning, during off-line symbol processing, to identify component symbols based on the plurality of training datasheets to identify symbol characteristics, including pin names and pin numbers corresponding to the component symbols in the plurality of training datasheets, and storing in memory the identified symbol characteristics;
   c) learning, during off-line footprint processing, to identify component footprints based on the plurality of training datasheets to identify footprint characteristics, including pad locations and dimension lines corresponding to the component footprints in the plurality of training datasheets, and storing in the memory the identified footprint characteristics;
   d) providing a selected component datasheet containing a component to use in the printed circuit board design tool;
   e) extracting, during on-line symbol processing, a component symbol of the selected component datasheet based on the learned symbol characteristics;
   f) extracting, during on-line footprint processing, a component footprint of the selected component datasheet based on the learned footprint characteristics;
   g) merging the extracted component symbol and the extracted component footprint to generate a completed component corresponding to the selected component, and providing the completed component to the printed circuit board design tool.

2. The method of claim 1, wherein the selected component datasheet corresponds to a new component datasheet that was not included in the plurality of training datasheets.

3. The method of claim 1, wherein the selected component datasheet provided to the on-line symbol processing and on-line footprint processing represents a new component not previously processed by the on-line symbol processing or the on-line footprint processing.

4. The method of claim 1, wherein the plurality of training datasheets used during the off-line symbol processing and the off-line footprint processing is less than 10% of available datasheets.

5. The method of claim 1, wherein the completed component is converted to a format compatible with a selected printed circuit board design tool.

6. The method of claim 1, wherein the printed circuit board design tool incorporates the completed component into a printed circuit design layout.

7. The method of claim 1, wherein the selected component datasheet is selected by a user.

8. A method for generating an electronic component symbol and a corresponding component footprint for use in a printed circuit board design tool, the method comprising:
   a) providing a plurality of training datasheets corresponding to a plurality of components, wherein the plurality of training datasheets represents between 0.10% to 40% of available datasheets;
   b) learning, during off-line symbol processing, to identify component symbols based on the plurality of training datasheets to identify symbol characteristics, including pin names and pin numbers corresponding to the component symbols in the plurality of training datasheets, and storing in memory the identified symbol characteristics;
   c) learning, during off-line footprint processing, to identify component footprints based on the plurality of training datasheets to identify footprint characteristics, including pad locations and dimension lines corresponding to the component footprints in the plurality of training datasheets, and storing in the memory the identified footprint characteristics;
   d) providing a selected component datasheet containing a component to use in the printed circuit board design tool;
   e) extracting, during on-line symbol processing, a component symbol of the selected component datasheet based on the learned symbol characteristics, wherein the on-line symbol processing further includes:
      1) parsing symbol component data based on the selected component datasheet;
      2) detecting a symbol in the selected component datasheet based on the stored identified symbol characteristics;
      3) detecting pin names and pin numbers in the selected component datasheet based on the stored identified symbol characteristics;
      4) associating the detected pin names with the detected pin numbers;
      5) generating a symbol component part for the selected component datasheet based on the detected pin names and the detected pin numbers;
   f) extracting, during on-line footprint processing, a component footprint of the selected component datasheet based on the learned footprint characteristics, wherein the on-line footprint processing further includes:
      1) parsing footprint component data based on the selected component datasheet;
      2) detecting a footprint in the selected component datasheet based on the stored identified footprint characteristics;
      3) detecting pad locations in the selected component datasheet by statistically examining regions of interest for repetitive shapes;
      4) determining dimension lines in the selected component datasheet;
      5) associating the detected pad locations with the determined dimension lines;
      6) applying the determined dimension lines to the associated detected pad locations to generate a footprint component part for the selected component datasheet based on the detected pad locations and corresponding dimension lines;
   g) merging the extracted component symbol and the extracted component footprint to generate a completed component corresponding to the selected component, and providing the completed component to the printed circuit board design tool.

9. The method of claim 8, wherein the selected component datasheet corresponds to a new component datasheet that was not included in the plurality of training datasheets.

10. The method of claim 8, wherein the selected component datasheet provided to the on-line symbol processing and to the on-line footprint processing represents a new component not previously processed by the on-line symbol processing or the on-line footprint processing.

11. The method of claim 8, wherein the completed component is converted to a format compatible with a selected printed circuit board design tool.

12. The method of claim 8, wherein the printed circuit board design tool incorporates the completed component into a printed circuit design layout.

13. A method for generating electronic component symbols and corresponding component footprints for use in a printed circuit board design tool, the method comprising:
   a) extracting component symbols in an off-line manner based on a plurality of component training datasheets, wherein the off-line extraction of component symbols includes identifying distinct characteristics of component symbols including component pin names and component pin numbers, and storing in memory the identified distinct characteristics of the symbols;
   b) extracting component footprints in an off-line manner based on the plurality of component training datasheets, wherein the off-line extraction of component footprints includes identifying distinct characteristics of component footprints including component pad locations and component dimension-lines, and storing in memory the identified distinct characteristics of the footprints;
   c) extracting a component symbol based on a selected component datasheet during on-line processing, wherein the on-line extraction of component symbol in the selected datasheet includes:
      1) detecting a symbol in the selected component datasheet based on the stored identified distinct characteristics of the symbols;
      2) detecting pin names and pin numbers in the selected component datasheet based on the stored identified distinct characteristics of the symbols;
      3) associating the detected pin names with the detected pin numbers;
      4) generating a component part based on the detected pin names and the detected pin numbers;
   d) extracting a component footprint based on the selected component datasheet during on-line processing, wherein the on-line extraction of the component footprint in the selected datasheet includes:
      1) detecting a footprint in the selected component datasheet based on the stored identified distinct characteristics of the footprints;

2) detecting pad locations in the selected component datasheet by statistically examining regions of interest for repetitive shapes;

3) determining dimension-lines in the selected component datasheet;

4) associating the detected pad locations with the determined dimensional lines;

5) applying the determined dimensional lines to the associated detected pads to generate a complete footprint; and e) providing the extracted symbol and complete footprint corresponding to the selected component as a completed component to the printed circuit board design tool.

14. The method of claim 13, wherein the selected component datasheet corresponds to a new component datasheet that was not included in the plurality of component training datasheets.

15. The method of claim 13, wherein the selected component datasheet provided to the on-line symbol processing and to the on-line footprint processing represents a new component not previously processed by the on-line symbol processing and the on-line footprint processing.

16. The method of claim 13, wherein the plurality of training datasheets used during extraction of component symbols in an off-line manner and extraction component footprints in an off-line manner is less than 10% of available datasheets.

17. The method of claim 13, wherein the plurality of training datasheets used during extraction of component symbols in an off-line manner and extraction component footprints in an off-line manner represents between 0.1% and 40% of available datasheets.

18. The method of claim 13, wherein the completed component is converted to a format compatible with a selected printed circuit board design tool.

19. The method of claim 13, wherein the printed circuit board design tool incorporates the completed component into a printed circuit design layout.

* * * * *